(12) United States Patent
Wang et al.

(10) Patent No.: US 12,457,058 B2
(45) Date of Patent: Oct. 28, 2025

(54) DATA TRANSMISSION METHOD AND DEVICE

(71) Applicant: HUAWEI TECHNOLOGIES CO., LTD., Shenzhen (CN)

(72) Inventors: Guijie Wang, Shenzhen (CN); Gongzheng Zhang, Hangzhou (CN); Yinggang Du, Shenzhen (CN); Yunfei Qiao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/476,665

(22) Filed: Sep. 16, 2021

(65) Prior Publication Data

US 2022/0006566 A1 Jan. 6, 2022

Related U.S. Application Data

(63) Continuation of application No. PCT/CN2020/077070, filed on Feb. 28, 2020.

(30) Foreign Application Priority Data

Mar. 18, 2019 (CN) .......................... 201910204038.3

(51) Int. Cl.
*H04W 4/00* (2018.01)
*H04L 1/08* (2006.01)
*H04L 5/00* (2006.01)

(52) U.S. Cl.
CPC .............. *H04L 1/08* (2013.01); *H04L 5/0057* (2013.01)

(58) Field of Classification Search
CPC ....... H04L 1/08; H04L 5/0057; H04L 1/1825; H04L 5/0053; H04L 1/00; H04L 1/1822;
(Continued)

(56) References Cited

U.S. PATENT DOCUMENTS

2009/0319850 A1* 12/2009 Baek ..................... H04L 1/1874
714/E11.131
2010/0037115 A1* 2/2010 Zheng ................... H04L 1/1822
714/748

(Continued)

FOREIGN PATENT DOCUMENTS

CN 1960235 A 5/2007
CN 101174931 A 5/2008
(Continued)

*Primary Examiner* — Edan Orgad
*Assistant Examiner* — Hidayat Dabiri
(74) *Attorney, Agent, or Firm* — Rimon PC

(57) ABSTRACT

Embodiments of this application provide a data transmission method and related device. The method includes: A receive end receives data from a transmit end; and sends a first response message to the transmit end at a triggering moment of a first preset condition. The first response message comprises acknowledgement (ACK) or negative acknowledgement (NACK) determined based on a channel quality evaluation result obtained by the receive end after evaluating channel quality of a first channel of the transmit end. The first response message is used by the transmit end to determine, based on the ACK or NACK carried in the first response message, whether to resend the data. The receive end may estimate the channel quality in advance, to predetermine a data receiving status before the data is actually received, and return the channel quality to the transmit end at preset moments. This effectively shortens a data transmission delay.

10 Claims, 12 Drawing Sheets

(58) Field of Classification Search
CPC ....... H04L 1/1874; H04L 1/20; H04L 5/0055; H04L 1/1861; H04L 1/0015; H04L 1/1812; H04B 17/309
See application file for complete search history.

(56) References Cited

U.S. PATENT DOCUMENTS

| | | | | |
|---|---|---|---|---|
| 2010/0039926 | A1* | 2/2010 | Zhang | H04J 13/0048 370/208 |
| 2010/0322136 | A1* | 12/2010 | Kanazawa | H04L 1/0026 370/312 |
| 2011/0170450 | A1* | 7/2011 | Juntti | H04L 1/1867 370/252 |
| 2014/0029557 | A1* | 1/2014 | Jongren | H04L 1/1861 370/329 |
| 2014/0211708 | A1* | 7/2014 | Zhao | H04W 72/56 370/329 |
| 2015/0023305 | A1 | 1/2015 | Yin et al. | |
| 2015/0036630 | A1* | 2/2015 | Chen | H04W 72/542 370/329 |
| 2015/0201428 | A1* | 7/2015 | Mills | H04L 1/0009 455/452.2 |
| 2016/0285594 | A1* | 9/2016 | Chen | H04L 1/189 |
| 2017/0251469 | A1* | 8/2017 | Lee | H04W 72/0446 |
| 2017/0332358 | A1* | 11/2017 | Park | H04L 1/1671 |
| 2019/0007863 | A1* | 1/2019 | Kim | H04L 1/1635 |
| 2020/0052832 | A1* | 2/2020 | Tian | H04L 1/1614 |
| 2020/0112357 | A1* | 4/2020 | Fakoorian | H04L 1/0009 |
| 2020/0146034 | A1* | 5/2020 | Bagheri | H04L 1/1822 |
| 2022/0078778 | A1* | 3/2022 | Zhao | H04L 1/1887 |

FOREIGN PATENT DOCUMENTS

| | | |
|---|---|---|
| CN | 102523604 A | 6/2012 |
| CN | 102684853 A | 9/2012 |
| CN | 107409019 A | 11/2017 |
| CN | 108631954 A | 10/2018 |
| DE | 102004006762 A1 | 9/2005 |
| KR | 20080028058 A | 3/2008 |

* cited by examiner

DATA TRANSMISSION METHOD AND DEVICE

CROSS-REFERENCE TO RELATED APPLICATION

This application is a continuation of International Patent Application No. PCT/CN2020/077070, filed on Feb. 28, 2020, which claims priority to Chinese Patent Application No. 201910204038.3, filed on Mar. 18, 2019. The disclosures of the aforementioned applications are hereby incorporated by reference in their entireties.

TECHNICAL FIELD

Embodiments of this application relate to the communication field, and in particular, to a data transmission method and a device.

BACKGROUND

With development of communications technologies, communications convergence between a terrestrial base station and a non-terrestrial base station (for example, a satellite, a hot air balloon that can implement a base station function, or a high-altitude platform such as an unmanned aerial vehicle) becomes an inevitable trend of next-generation wireless communications.

A base station in the conventional technology uses a hybrid automatic repeat request (HARQ) technology, to increase a success rate of receiving a data packet. However, in satellite communications, a transmission delay is relatively large due to a distance limitation. Consequently, the throughput is relatively low when an HARQ mechanism is applied to non-terrestrial communications systems such as a satellite. However, in the conventional technology, a requirement on a storage capability and a data processing capability of UE is increased because a quantity of HARQ threads is increased. Similarly, if the solution is applied to the non-terrestrial communications systems such as a satellite, a quantity of threads at a transmit end and at a receive end becomes excessively large, and can even reach 500 threads. It is clear that the HARQ technology in the conventional technology cannot be applied to a satellite communications system.

SUMMARY

This application provides a data transmission method and a device, to implement an HARQ technology in a non-terrestrial communications system, thereby implementing communications convergence between a terrestrial communications system and a non-terrestrial communications system.

To achieve the foregoing objective, the following technical solutions are disclosed in this application.

According to a first aspect, an embodiment of this application provides a data transmission method that is applied to a receive end. The method may include: The receive end receives data from a transmit end; and the receive end sends a first response message to the transmit end at a triggering moment of a first preset condition, where the first response message is determined based on a channel quality evaluation result after the receive end evaluates channel quality of a first channel of the transmit end; and the first response message is used by the transmit end to determine, based on first acknowledgment information or first negative acknowledgment information carried in the first response message, whether to resend the data.

In the foregoing manner, an HARQ solution that may be applied to a terrestrial communications system and a non-terrestrial communications system is proposed. The receive end may estimate the channel quality in advance to predetermine a data receiving status, and return response information to the transmit end at each triggering moment of a preset condition. This effectively shortens a data transmission delay.

In a possible implementation, the method may further include: obtaining a channel parameter of the first channel; and determining, based on the channel parameter, that the first response message carries first acknowledgment information or first negative acknowledgment information. If the channel parameter meets a second preset condition, the first response message carries the first acknowledgment information; or if the channel parameter does not meet a second preset condition, the first response message carries the first negative acknowledgment information.

In the foregoing manner, a feedback mechanism is implemented. The receive end may determine, based on a channel parameter of a channel, information fed back to the transmit end, so that the transmit end may determine, based on the response information that is fed back, whether to retransmit the data.

In a possible implementation, the second preset condition may include: A difference between the channel parameter and a last obtained channel parameter is greater than or equal to a first threshold; or the channel parameter is greater than or equal to a second threshold.

In the foregoing manner, a feedback mechanism is implemented. The receive end may determine, based on a channel parameter of a channel, information to be fed back to the transmit end, so that the transmit end may determine, based on the response information that is fed back, whether to retransmit the data.

In a possible implementation, the channel parameter includes at least one of the following: a channel quality indicator (CQI), a modulation and coding scheme (MCS), a CQI index, or an MCS index.

In the foregoing manner, the receive end may estimate the channel quality based on one or more of the foregoing channel parameters, to improve channel estimation reliability.

In a possible implementation, after the sending a first response message to the transmit end, the method further includes: The receive end decodes the data; returns a second response message to the transmit end based on a decoding result. If the decoding result indicates a success, the second response information carries second acknowledgment information; or if the decoding result indicates a failure, the second response information carries second negative information, where the second negative information is used to indicate to the transmit end to resend the data.

In the foregoing manner, the receive end may combine a new HARQ solution with a conventional HARQ solution, to further improve data retransmission reliability.

In a possible implementation, the second acknowledgment information is used to indicate to the transmit end to end a hybrid automatic repeat request (HARQ) process corresponding to the data.

In the foregoing manner, the receive end may combine a new HARQ solution with a conventional HARQ solution, to further improve data retransmission reliability.

In a possible implementation, the first preset condition is a preset period or a preset time point agreed upon by the receive end and the transmit end.

In the foregoing manner, a feedback mechanism is implemented. The receive end may feed back information to the transmit end at an agreed time, to enhance flexibility of the feedback mechanism.

In a possible implementation, the first preset condition includes: If buffer usage of the receive end meets a preset threshold, it is determined that the first preset condition is triggered.

In the foregoing manner, a feedback mechanism is implemented. The receive end may determine whether to feed back information to the transmit end based on a buffer status of the receive end, to enhance selectability of the feedback mechanism.

In a possible implementation, the first preset condition may include: If the channel parameter meets the second preset condition, the first response message is not sent; or if the channel parameter result does not meet the second preset condition, the first response message that carries the first negative acknowledgment information is sent.

In the foregoing manner, a feedback mechanism is implemented. The receive end may determine whether to feed back information to the transmit end based on a status of an obtained channel parameter, to enhance selectability of the feedback mechanism.

In a possible implementation, the first preset condition may include: If the channel parameter meets the second preset condition, the first response message that carries the first acknowledgment information is sent; or if the channel parameter does not meet the second preset condition, the first response message is not sent.

In the foregoing manner, a feedback mechanism is implemented. The receive end may determine whether to feed back information to the transmit end based on a status of an obtained channel parameter, to enhance selectability of the feedback mechanism.

In a possible implementation, the first acknowledgment information is used to indicate to the transmit end to wait for a next first response message, or used to indicate to the transmit end to end an HARQ process corresponding to the data; and the first negative acknowledgment information is used to indicate to the transmit end to resend the data.

According to a second aspect, an embodiment of this application provides a data transmission method, which is applied to a transmit end. The method may include: sending data to a receive end; determining, based on a receiving status of a first response message, whether to resend the data, where the first response message is determined based on a channel quality evaluation result after the receive end evaluates channel quality of a first channel of the transmit end, and is sent to the transmit end at a triggering moment of a first preset condition; and retransmitting the data to the receive end if a determining result is to resend the data.

In a possible implementation, the step of determining, based on a receiving status of a first response message, whether to resend the data includes: detecting, based on a preset period or a preset time point agreed with the receive end, whether the first response message exists on the first channel.

In a possible implementation, the step of determining, based on a receiving status of a first response message, whether to resend the data includes: if no first response message is detected in two or more consecutive preset periods, determining not to resend the data.

In a possible implementation, the step of determining, based on a receiving status of a first response message, whether to resend the data includes: if the first response message is not received at a triggering moment of the preset period, determining to resend the data.

In a possible implementation, the step of determining, based on a receiving status of a first response message, whether to resend the data includes: if a first response message that carries first acknowledgment information is received, determining not to resend the data; or if a first response message that carries first negative acknowledgment information is received, determining to resend the data.

In a possible implementation, the step of determining, based on a receiving status of a first response message, whether to resend the data includes: if two or more consecutive first response messages that carry first acknowledgment information are received, ending an HARQ process corresponding to the data.

In a possible implementation, the first acknowledgment information is sent to the transmit end after the receive end obtains a channel parameter of the first channel and detects that a first channel parameter meets a second preset condition; and the first negative acknowledgment information is sent to the transmit end after the receive end detects that the first channel parameter does not meet the second preset condition.

In a possible implementation, the step of determining, based on a receiving status of a first response message, whether to resend the data includes: if a first response message that carries second acknowledgment information is received, ending an HARQ process corresponding to the data; or if a first response message that carries second negative information is received, determining to resend the data.

In a possible implementation, the second acknowledgment information is sent to the transmit end after the receive end successfully decodes the data; and the second negative information is sent to the transmit end after the receive end fails to decode the data.

According to a third aspect, an embodiment of this application provides a receiving device. The receiving device may include a receiving module and a sending module. The receiving module is configured to receive data from a transmit end. The sending module is configured to send a first response message to the transmit end at a triggering moment of a first preset condition. The first response message is determined based on a channel quality evaluation result after a receive end evaluates channel quality of a first channel of the transmit end; and the first response message is used by the transmit end to determine, based on first acknowledgment information or first negative acknowledgment information carried in the first response message, whether to resend the data.

In a possible implementation, the receiving device may further include an obtaining module and a determining module. The obtaining module is configured to obtain a channel parameter of the first channel. The determining module is configured to determine, based on the channel parameter, that the first response message carries the first acknowledgment information or the first negative acknowledgment information. If the channel parameter meets a second preset condition, the first response message carries the first acknowledgment information; or if the channel parameter does not meet a second preset condition, the first response message carries the first negative acknowledgment information.

In a possible implementation, the second preset condition may include: A difference between the channel parameter and a last obtained channel parameter is greater than or equal to a first threshold; or the channel parameter is greater than or equal to a second threshold.

In a possible implementation, the channel parameter includes at least one of the following: a channel quality indicator (CQI), a modulation and coding scheme (MCS), a CQI index, or an MCS index.

In a possible implementation, the receiving device may further include: a decoding module, configured to decode the data. Correspondingly, the sending module may be further configured to return second response information to the transmit end based on a decoding result. If the decoding result indicates a success, the second response information carries second acknowledgment information; or if the decoding result indicates a failure, the second response information carries second negative information, where the second negative information is used to indicate to the transmit end to resend the data.

In a possible implementation, the second acknowledgment information is used to indicate to the transmit end to end a hybrid automatic repeat request (HARQ) process corresponding to the data.

In a possible implementation, the first preset condition is a preset period or a preset time point agreed upon by the receive end and the transmit end.

In a possible implementation, the first preset condition includes: If buffer usage of the receive end meets a preset threshold, it is determined that the first preset condition is triggered.

In a possible implementation, the first preset condition includes: If the channel parameter meets the second preset condition, the first response message is not sent; or if the channel parameter does not meet the second preset condition, the first response message that carries the first negative acknowledgment information is sent.

In a possible implementation, the first preset condition includes: If the channel parameter meets the second preset condition, the first response message that carries the first acknowledgment information is sent; or if the channel parameter does not meet the second preset condition, the first response message is not sent.

In a possible implementation, the first acknowledgment information is used to indicate to the transmit end to wait for a next first response message, or used to indicate to the transmit end to end an HARQ process corresponding to the data; and the first negative acknowledgment information is used to indicate to the transmit end to resend the data.

According to a fourth aspect, an embodiment of this application provides a sending device. The device may include a sending module and a determining module. The sending module is configured to send data to a receive end. The determining module is configured to determine, based on a receiving status of a first response message, whether to resend the data. The first response message is determined based on a channel quality evaluation result after the receive end evaluates channel quality of a first channel of the transmit end, and is sent to the transmit end at a triggering moment of a first preset condition. The sending module may be further configured to retransmit the data to the receive end if a determining result of the determining module is to resend the data.

In a possible implementation, the determining module is further configured to detect, based on a preset period or a preset time point agreed with the receive end, whether the first response message exists on the first channel.

In a possible implementation, the determining module is further configured to: if no first response message is detected in two or more consecutive preset periods, determine not to resend the data.

In a possible implementation, the determining module is further configured to: if the first response message is not received at a triggering moment of the preset period, determine to resend the data.

In a possible implementation, the determining module is further configured to: if a first response message that carries first acknowledgment information is received, determine not to resend the data; or if a first response message that carries first negative acknowledgment information is received, determine to resend the data.

In a possible implementation, the determining module is further configured to: if two or more consecutive first response messages that carry first acknowledgment information are received, end an HARQ process corresponding to the data.

In a possible implementation, the first acknowledgment information is sent to the transmit end after the receive end obtains a channel parameter of the first channel and detects that a first channel parameter meets a second preset condition; and the first negative acknowledgment information is sent to the transmit end after the receive end detects that the first channel parameter does not meet the second preset condition.

In a possible implementation, the determining module is further configured to: if a first response message that carries second acknowledgment information is received, end an HARQ process corresponding to the data; or if a first response message that carries second negative information is received, determine to resend the data.

In a possible implementation, the second acknowledgment information is sent to the transmit end after the receive end successfully decodes the data; and the second negative information is sent to the transmit end after the receive end fails to decode the data.

According to a fifth aspect, an embodiment of this application provides a receiving device, including a transceiver/a transceiver pin and a processor, and optionally, further including a memory. The transceiver/the transceiver pin, the processor, and the memory communicate with each other through an internal connection path. The processor is configured to execute instructions to control the transceiver/transceiver pin to send or receive a signal. The memory is configured to store the instructions. When the processor executes the instructions, the processor performs the method according to any one of the first aspect or the possible implementations of the first aspect.

According to a sixth aspect, an embodiment of this application provides a sending device, including a transceiver/a transceiver pin and a processor, and optionally, further including a memory. The transceiver/the transceiver pin, the processor, and the memory communicate with each other through an internal connection path. The processor is configured to execute instructions to control the transceiver/transceiver pin to send or receive a signal. The memory is configured to store the instructions. When the processor executes the instructions, the processor performs the method according to any one of the second aspect or the possible implementations of the second aspect.

According to a seventh aspect, an embodiment of this application provides a computer-readable medium, configured to store a computer program. The computer program includes instructions used to perform the method according to any one of the first aspect or the possible implementations of the first aspect.

According to an eighth aspect, an embodiment of this application provides a computer-readable medium, configured to store a computer program. The computer program includes instructions used to perform the method according to any one of the second aspect or the possible implementations of the second aspect.

According to a ninth aspect, an embodiment of this application provides a computer program. The computer program includes instructions used to perform the method according to any one of the first aspect or the possible implementations of the first aspect.

According to a tenth aspect, an embodiment of this application provides a computer program. The computer program includes instructions used to perform the method according to any one of the second aspect or the possible implementations of the second aspect.

According to an eleventh aspect, an embodiment of this application provides a chip. The chip includes a processing circuit and a transceiver pin. The transceiver pin and the processing circuit communicate with each other through an internal connection path. The processing circuit performs the method according to any one of the first aspect or the possible implementations of the first aspect, to control a receive pin to receive a signal, and to control a transmit pin to send a signal.

According to a twelfth aspect, an embodiment of this application provides a chip. The chip includes a processing circuit and a transceiver pin. The transceiver pin and the processing circuit communicate with each other through an internal connection path. The processor performs the method according to any one of the second aspect or the possible implementations of the second aspect, to control a receive pin to receive a signal, and to control a transmit pin to send a signal.

According to a thirteenth aspect, an embodiment of this application provides a data transmission system. The system includes the receive end and the transmit end in the first aspect and the second aspect.

BRIEF DESCRIPTION OF DRAWINGS

To describe the technical solutions in embodiments of this application more clearly, the following briefly describes the accompanying drawings required for describing the embodiments of this application. It is clear that the accompanying drawings in the following description show merely some embodiments of this application, and a person of ordinary skill in the art may still derive other drawings from these accompanying drawings without creative efforts.

DESCRIPTION OF EMBODIMENTS

Figure 1:
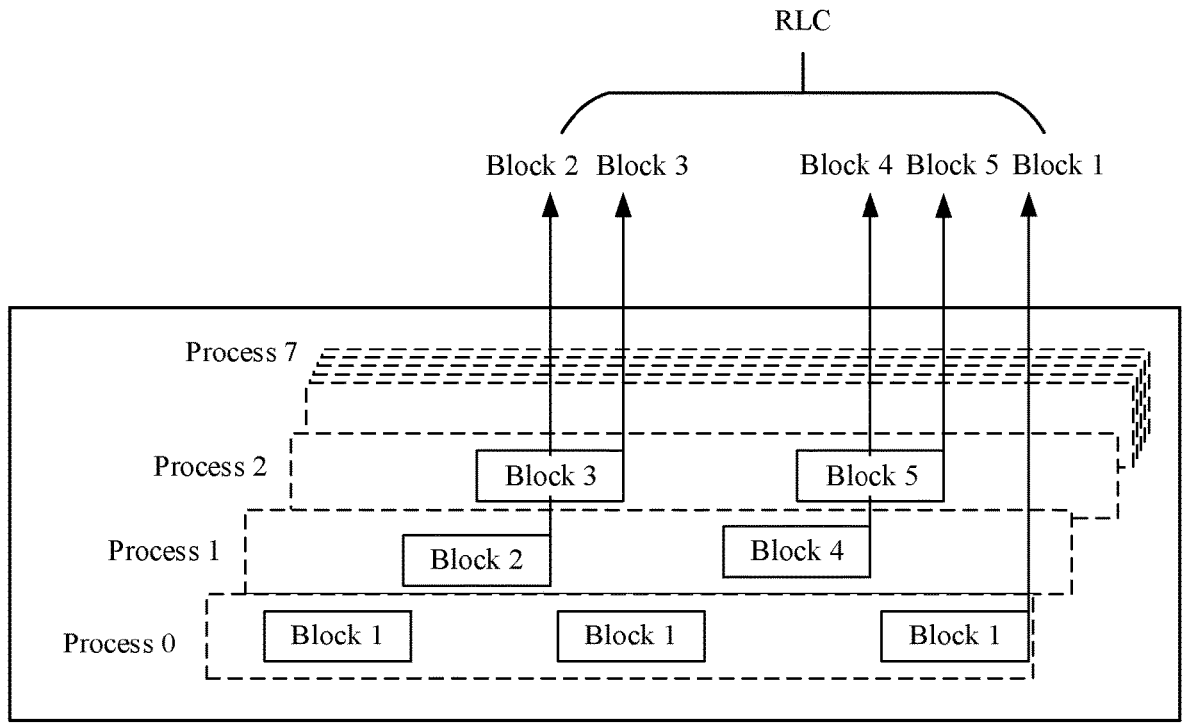
FIG. 1 is a schematic diagram of an example of HARQ transmission.

The following clearly describes the technical solutions in the embodiments of this application with reference to the accompanying drawings in the embodiments of this application. It is clear that the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and so on are intended to distinguish between different objects but do not indicate a particular order of the objects. For example, a first target object, a second target object, and the like are used to distinguish between different target objects, but are not used to describe a specific order of the target objects.

In addition, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

In the description of the embodiments of this application, unless otherwise stated, "a plurality of" means two or more than two. For example, a plurality of processing units are two or more processing units; and a plurality of systems are two or more systems.

To make a person skilled in the art better understand the technical solutions in this application, the following briefly describes an existing technology in this application.

An HARQ technology is a technology combining a forward error correction (FEC) method and an automatic repeat request (ARQ) method.

Specifically, the FEC technology enables a receive end to correct some errors by adding redundant information. This reduces a quantity of retransmissions. For an error that cannot be corrected by using the FEC technology, the receive end requests, by using an ARQ mechanism, a transmit end to retransmit data. The receive end uses an error-detection code that is usually referred to as cyclic redundancy check (CRC), to detect whether an error occurs in received data. If no error occurs, the receive end sends an acknowledgment (ACK) character to the transmit end; after receiving the ACK, the transmit end sends a next data packet. If an error occurs, the receive end discards the data packet and sends a negative acknowledgment (NACK) character to the transmit end; after receiving the NACK, the transmit end retransmits same data.

The ARQ mechanism uses a manner of discarding data packets and requesting retransmission. Although these data packets cannot be correctly decoded, useful information is still included in the data packets. If the data packets are discarded, the useful information is lost. HARQ with soft combining is then used, that is, a received error data packet is stored in an HARQ buffer by the receive end, and is combined with a retransmitted data packet that is subsequently received, to obtain a more reliable data packet than a data packet that is obtained through separate decoding. Then, the receive end decodes a combined data packet. If decoding still fails, a process of "requesting retransmission, and then performing soft combining" is repeated.

The HARQ determines whether an error occurs in a received data packet by using CRC check, and the check CRC is performed after soft combining. If the CRC check succeeds, the receive end sends a positive acknowledgement (ACK); and if the CRC check fails, the receive end sends a negative acknowledgement (NACK).

In addition, it should be noted that the HARQ uses a stop-and-wait protocol to send data. Specifically, in the stop and wait protocol, after sending a data packet, the transmit end stops to wait for acknowledgment information. The receive end uses 1-bit information to perform acknowledgment (ACK) or negative acknowledgment (NACK) on the data packet. However, the transmit end stops to wait for acknowledgment after each transmission, resulting in a low throughput. Therefore, when a plurality of parallel stop-and-wait processes are used to wait for acknowledgment information, the transmit end may continue sending data by using another HARQ process, so that the data can be continuously transmitted.

Each HARQ process includes an independent HARQ buffer to perform soft combining on received data.

Using a plurality of parallel stop-and-wait processes may cause disorder of data sent from a medium access control (MAC) layer of the receive end to a radio link control (RLC) layer. As shown in FIG. 1, a transport block 5 is successfully decoded before a transport block 1. As a result, the transport block 5 is sent to an RLC layer before the transport block 1, leading to disorder of data occurs. Therefore, the RLC layer needs to reorder the received data. In carrier aggregation, the RLC layer needs to be responsible for data reordering in a unified manner. This is because the RLC layer is invisible to carrier aggregation, and each carrier unit has an independent HARQ entity. As a result, one RLC layer needs to receive data from a plurality of HARQ entities, and the data received from the plurality of HARQ entities may be out of order.

Therefore, after receiving a piece of acknowledgment information (ACK/NACK), a transmit end needs to know an HARQ process corresponding to the acknowledgment information. This is determined by using a fixed timeslot relationship between acknowledgment information and transmitted data. For HARQ, "initial transmission" and "retransmission" are meaningful only when the HARQ corresponds to same data (or a same transport block), that is, a same HARQ process.

In addition, HARQ is classified into downlink HARQ and uplink HARQ. The downlink HARQ is for downlink shared channel data, and the uplink HARQ is for uplink shared channel data. The downlink HARQ and the uplink HARQ are independent of each other, and processing manners are also different.

In the conventional technology, asynchronous HARQ transmission is used in both the uplink HARQ and the downlink HARQ, that is, retransmission may occur at any moment, and an HARQ process can be used in any order.

In addition, in the embodiments of this application, a related technology such as a channel parameter is further used. In the embodiments of this application, the channel parameter is used to evaluate channel quality, and an evaluation manner is described in detail in the following embodiments. The channel parameter includes but is not limited to a channel quality indicator (CQI), a modulation and coding scheme (MCS), a CQI index, an MCS index, and the like. The CQI is used to reflect channel quality of a physical downlink shared channel (PDSCH). A larger CQI value indicates better channel quality of the physical downlink shared channel. Currently, in a protocol, the CQI is represented by 0 to 15, where 0 indicates worst channel quality, and 15 indicates best channel quality.

Specifically, a terminal sends the CQI to a base station through a physical uplink shared channel (PUSCH)/physical uplink control channel (PUCCH). After obtaining the CQI value, the base station may evaluate channel quality of a current physical downlink shared channel based on the CQI, and may schedule a downlink resource based on an evaluation result.

The CQI is feedback information sent by the terminal to the base station through the physical uplink shared channel/physical uplink control channel. Subsequently, the base station determines a coding scheme based on the CQI reported by the terminal. Different CQI values correspond to different MCSs, that is, different coding schemes are used in correspondence to different channel quality.

Usually, the MCS is determined jointly by the CQI, an initial block error rate (IBLER), an inter-cell interference coordination (ICIC), and the like.

Currently, integration of a terrestrial communications system and a non-terrestrial communications system, for example, integration of a satellite communications technology and a 5G NR technology, gradually attracts wide attention of academia and the industry, to expand signal coverage and improve service quality. In an integration process, a significant challenge is how to handle a problem of an excessively long round-trip delay (RTD) in a satellite system. For example, for a geostationary orbit (GEO) satellite, an RTD of the satellite may reach hundreds of milliseconds, bringing non-negligible impact on an HARQ process in an existing 5G NR system.

Figure 2:
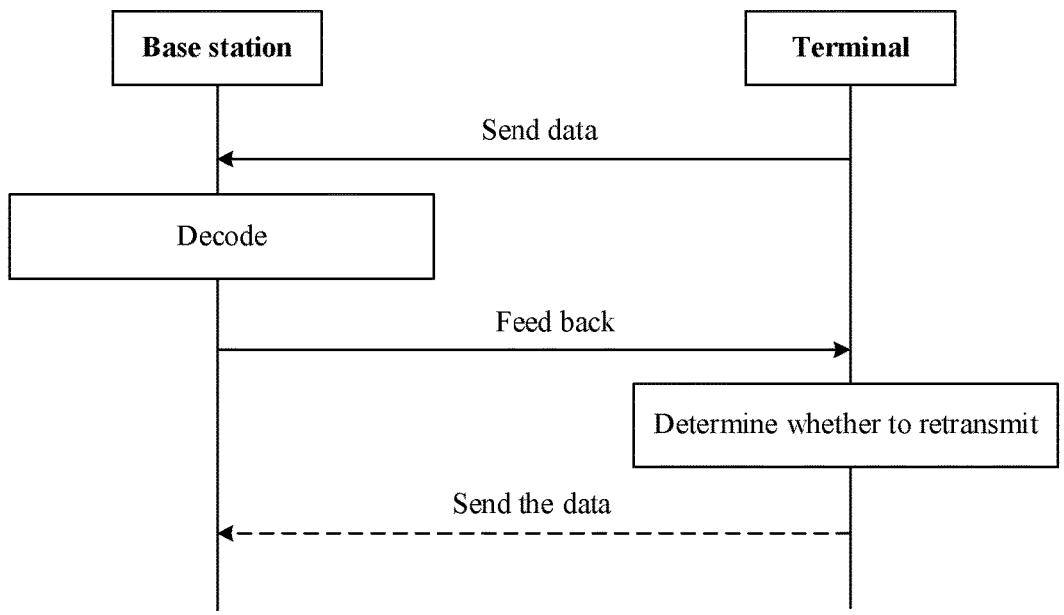
FIG. 2 is a schematic diagram of an example of HARQ transmission.

An HARQ solution in the conventional technology is shown in FIG. 2. Specifically, a transmit end sends data to a receive end. Then, the receive end decodes the received data. Then, the receive end feeds back ACK/NACK to the transmit end based on a decoding result. When the decoding results is correct, the ACK is fed back. When the decoding result is incorrect, the NACK is fed back. After receiving the ACK/NACK, the transmit end determines whether to resend the data. When receiving the NACK, the transmit end resends the data to the receive end; when receiving the ACK, the transmit end does not send the data.

In a terrestrial communications system in which the HARQ solution shown in FIG. 2 is used, for example, in LTE, a maximum allowable delay is 4 ms, and a corresponding quantity of HARQ processes is 8. In space division multiplexing, the quantity of HARQ processes may reach 16. However, in a satellite communications system, a quantity of HARQ processes increases correspondingly due to an excessively large round-trip delay, and may reach 500 especially in a GEO, which obviously exceeds a maximum quantity of HARQ processes allowed in a conventional HARQ. In addition, the quantity of HARQ processes cannot be implemented in actual communication. In addition, because the quantity of HARQ processes increases, required data buffering and processing capabilities of a terminal need to be correspondingly improved. In current communication, terminal equipment cannot meet this requirement.

In a current non-terrestrial communications system, no explicit HARQ solution is proposed. If an existing HARQ solution applied to LTE or NR is used, various technical problems occur. For example, if the quantity of HARQ processes is not changed, that is, is still 8 or 16, a communication throughput is relatively low. If the quantity of HARQ processes is linearly increased, in a near-Earth satellite, round-trip time duration is approximately 50 ms, a quantity of required HARQ processes is 50. The quantity of required HARQ processes is approximately 500 in the GEO. It is clear that the quantity of HARQ processes cannot be implemented in actual communication. In addition, in the existing HARQ technology, when the NACK/ACK is fed back, feedback can be provided only after complete decoding is performed on received data. Therefore, an additional decoding delay is incurred.

In conclusion, the embodiments of this application provide a data transmission method, which may be applied to the terrestrial communications system and/or the non-terrestrial communications system. Channel quality is evaluated to predict a data receiving status in advance, and response information is fed back to the transmit end to reduce impact of a delay on the HARQ.

Figure 3:
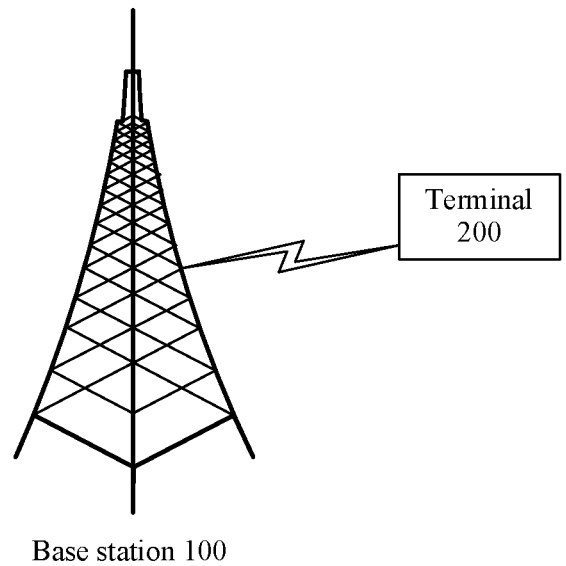
FIG. 3 is a schematic diagram of a communications system according to an embodiment of this application.

Before the technical solutions in the embodiments of this application are described, a communications system of the embodiments of this application is first described with reference to the accompanying drawings. FIG. 3 is a schematic diagram of a communications system according to an embodiment of this application. The communications system includes a base station 100, and a terminal 200. In some embodiments of this application, the terminal 200 may be a device such as a computer, a smartphone, a telephone set, a cable television set-top box, or a digital subscriber line router. The base station 100 may be a terrestrial base station or a non-terrestrial base station. The terrestrial base station includes but is not limited to a base station on the ground, and a base station on a mountain or in a water area. The non-terrestrial base station includes but is not limited to a satellite, a hot air balloon that can implement a base station function, a high-altitude platform such as an unmanned aerial vehicle, and the like. It should be noted that, during actual application, there may be one or more base stations and one or more terminals. A quantity of base stations and a quantity of terminals in the communications system shown in FIG. 1 are merely an example. This is not limited in this application.

The foregoing communications system may be used to support a fourth generation (4G) access technology, for example, a long term evolution (LTE) access technology; a fifth generation (5G) access technology, for example, a new radio (NR) access technology; a third generation (3G) access technology, for example, a universal mobile telecommunications system (UMTS) access technology; a second generation (2G) access technology, for example, a global system for mobile communications (GSM) access technology; or a plurality of wireless technologies, for example, an LTE technology and an NR technology. In addition, the communications system is also applicable to a narrowband internet of things (NB-IoT) system, an enhanced data rate for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and a future-oriented communications technology. In addition, the system may be a non-terrestrial communications system, for example, a satellite communications system or a high-altitude communications platform.

In addition, the base station in FIG. 3 may be configured to support access of the terminal. For example, the base station may be a base transceiver station (BTS) and a base station controller (BSC) in a 2G access technology communications system, a NodeB (Node B) and a radio network controller (RNC) in a 3G access technology communications system, an evolved NodeB (eNB) in a 4G access technology communications system, a next generation NodeB (gNB) in a 5G access technology communications system, a transmission reception point (TRP), a relay node, or an access point (AP). For ease of description, in all the embodiments of this application, all apparatuses that provide a wireless communication function for the terminal are referred to as a network device or a base station.

The terminal in FIG. 3 may be a device that provides voice or data connectivity for a user, and may also be referred to as, for example, a mobile station, a subscriber unit, a station, or terminal equipment (TE). The terminal may be a cellular phone, a personal digital assistant (PDA), a wireless modem, a handheld device, a laptop computer, a cordless phone, a wireless local loop (WLL) station, a tablet computer (pad), or the like. With development of wireless communications technologies, any device that can access a communications system, communicate with a network side of a communications system, or communicate with another object by using a communications system may be the terminal in the embodiments of this application, such as a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. In some embodiments of this application, the terminal may communicate with a base station, for example, the base station in FIG. 1. A plurality of terminals may also communicate with each other. The terminal may be static and fixed or mobile.

Figure 4A:
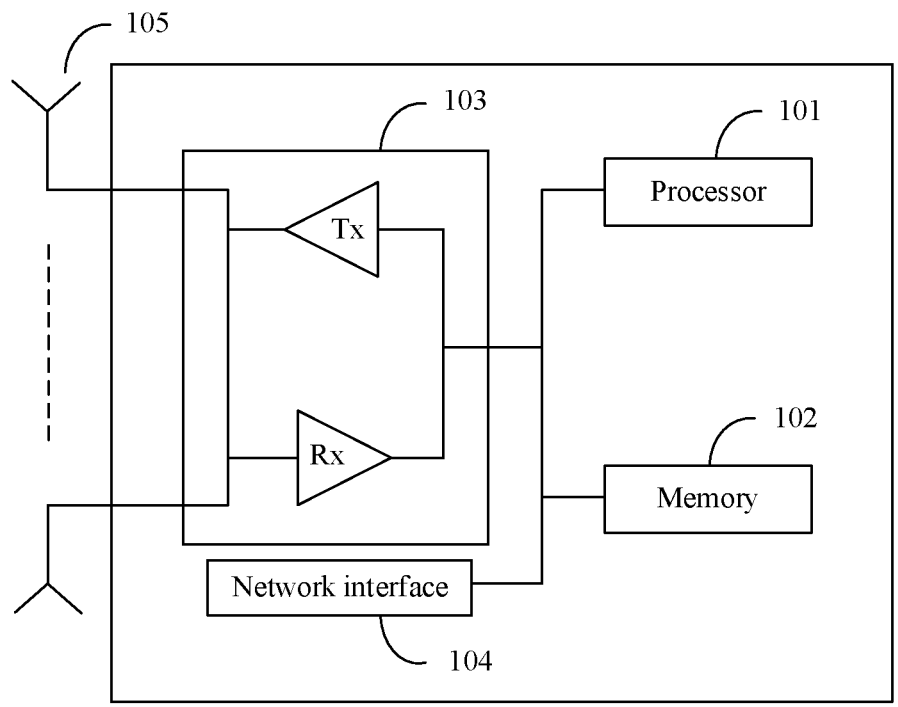
FIG. 4a is a schematic structural diagram of a base station according to an embodiment of this application.

FIG. 4a is a schematic structural diagram of a base station. In FIG. 4a, the base station includes at least one processor 101, at least one memory 102, at least one transceiver 103, at least one network interface 104, and one or more antennas 105. The processor 101, the memory 102, the transceiver 103, and the network interface 104 are connected through, for example, buses. The antenna 105 is connected to the transceiver 103. The network interface 104 is configured to enable the base station to connect to another communications device through a communication link. In some embodiments of this application, the connection may include various types of interfaces, transmission lines, buses, or the like. This is not limited in these embodiments.

In an embodiment of this application, the processor such as the processor 101 may include at least one of the following types: a general-purpose central processing unit (CPU), a digital signal processor (DSP), a microprocessor, an application-specific integrated circuit (ASIC), a microcontroller (MCU), a field programmable gate array (FPGA), or an integrated circuit configured to implement a logical operation. For example, the processor 101 may be a single-core processor (single-CPU) or a multi-core processor (multi-CPU). The at least one processor 101 may be integrated into one chip or located on a plurality of different chips.

In an embodiment of this application, the memory such as the memory 102 may include at least one of the following types: a read-only memory (ROM) or another type of static storage device capable of storing static information and instructions, a random access memory (RAM) or another type of dynamic storage device capable of storing information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, the memory is not limited thereto.

The memory 102 may exist independently, and is connected to the processor 101. Optionally, the memory 102 and the processor 101 may alternatively be integrated, for example, integrated into a chip. The memory 102 can store program code for executing the technical solutions in the embodiments of this application, and the processor 101 controls execution of the program code. Various types of executed computer program code may also be considered as drivers of the processor 101. For example, the processor 101 is configured to execute the computer program code stored in the memory 102, to implement the technical solutions in the embodiments of this application. Optionally, the memory 102 may alternatively be outside the chip and connected to the processor 101 through an interface.

The transceiver 103 may be configured to support receiving or sending of a radio frequency signal between an access network device and a terminal, and the transceiver 103 may be connected to the antenna 105. The transceiver 103 includes a transmitter Tx and a receiver Rx. Specifically, the one or more antennas 105 may receive a radio frequency signal. The receiver Rx of the transceiver 103 is configured to: receive the radio frequency signal from the antenna, convert the radio frequency signal into a digital baseband signal or a digital intermediate frequency signal, and provide the digital baseband signal or the digital intermediate frequency signal for the processor 101, so that the processor 101 further processes, for example, performs demodulation processing and decoding processing on, the digital baseband signal or the digital intermediate frequency signal. In addition, the transmitter Tx of the transceiver 103 is further configured to: receive a modulated digital baseband signal or digital intermediate frequency signal from the processor 101, convert the modulated digital baseband signal or digital intermediate frequency signal into a radio frequency signal, and send the radio frequency signal through the one or more antennas 105. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

Figure 4B:
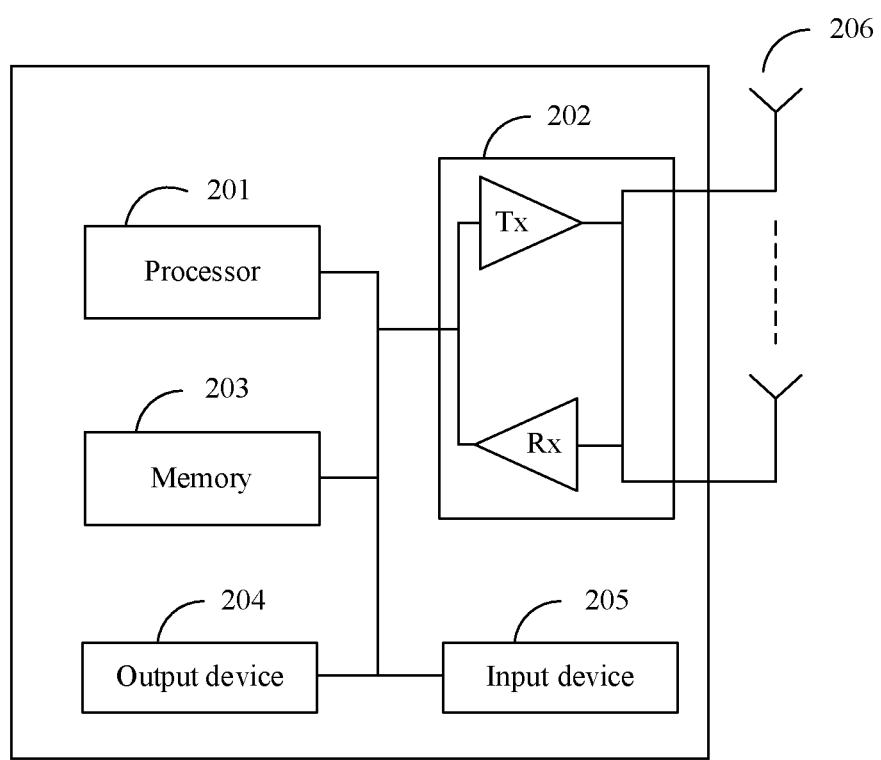
FIG. 4b is a schematic structural diagram of a terminal according to an embodiment of this application.

FIG. 4b is a schematic structural diagram of a terminal. In FIG. 4b, the terminal includes at least one processor 201, at least one transceiver 202, and at least one memory 203. The processor 201, the memory 203, and the transceiver 202 are connected. Optionally, the terminal may further include an output device 204, an input device 205, and one or more antennas 206. The antenna 206 is connected to the transceiver 202, and the output device 204 and the input device 205 are connected to the processor 201.

For the transceiver 202, the memory 203, and the antenna 206, refer to related descriptions in FIG. 4a, to implement a similar function.

The processor 201 may be a baseband processor, or may be a CPU. The baseband processor and the CPU may be integrated or separated.

The processor 201 may be configured to implement various functions for the terminal, for example, configured to process a communication protocol and communication data, or configured to: control entire terminal equipment, execute a software program, and process data of the software program, or configured to assist in completing a computing processing task, for example, graphics and image processing or audio processing. Alternatively, the processor 201 is configured to implement one or more of the foregoing functions.

The output device 204 communicates with the processor 201, and may display information in a plurality of manners. For example, the output device 204 may be a liquid crystal display (LCD), a light emitting diode (LED) display device, a cathode ray tube (CRT) display device, or a projector. The input device 205 communicates with the processor 201, and may receive user input in a plurality of manners. For example, the input device 205 may be a mouse, a keyboard, a touchscreen device, a sensing device, or the like.

The memory 203 may exist independently, and is connected to the processor 201. Optionally, the memory 203 and the processor 201 may alternatively be integrated, for example, integrated into a chip. The memory 203 can store program code for executing the technical solutions in the embodiments of this application, and the processor 201 controls execution of the program code. Various types of executed computer program code may also be considered as drivers of the processor 201. For example, the processor 201 is configured to execute the computer program code stored in the memory 203, to implement the technical solutions in the embodiments of this application. Optionally, the memory 203 may alternatively be outside the chip and connected to the processor 201 through an interface.

An implementation solution of this application is described below with reference to the schematic diagram of the application scenario shown in FIG. 3.

Figure 5:
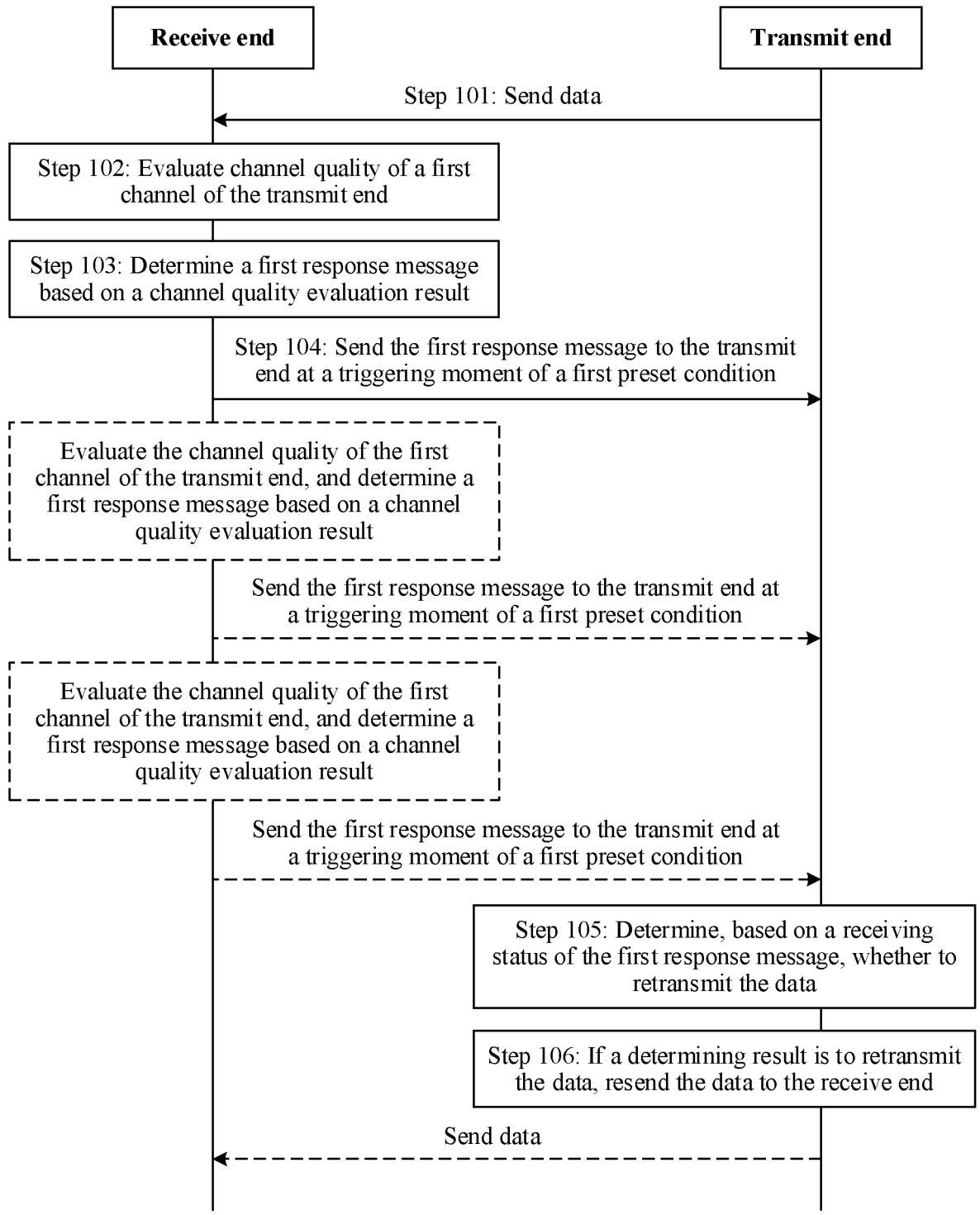
FIG. 5 is a schematic flowchart of a data transmission method according to an embodiment of this application.

Scenario 1:

With reference to FIG. 3, FIG. 5 is a schematic flowchart of a data transmission method according to an embodiment of this application. FIG. 5 includes following steps.

Step 101: A transmit end sends data.

Specifically, in an embodiment of this application, the transmit end sends a data packet to a receive end through a first channel. The data packet carries the data and other information, and the other information includes but is not limited to information such as redundant information and identification information. For example, if the transmit end sends a letter "A" to the receive end, the letter "A" is the data. In addition to the data, the data packet further carries identification information of the data packet, redundancy version (RV) information, and the like, where the identification information is used to uniquely identify the data packet.

In some embodiments of this application, if the transmit end is a terminal, the first channel is a PUSCH corresponding to data sent by the terminal to the receive end. If the transmit end is a base station, the first channel is a PDSCH corresponding to data sent by the base station to the terminal. It should be noted that, for example, the transmit end is a terminal, and a resource occupied by the data packet sent by the transmit end is a specified resource on a carrier corresponding to the first channel. In other words, the first channel is used to transmit data of a plurality of terminals. To be specific, in a subsequent step, that the base station evaluates channel quality of the first channel means that the base station evaluates the channel on which the data is located. Specific details are described in detail in step 102.

In addition, in some embodiments of this application, in addition to sending the data packet, the transmit end further sends, to the receive end through a PUCCH/PUSCH, identification information of an HARQ process corresponding to the data packet, so that the receive end and the transmit end process a same HARQ process, that is, a same data packet in a process such as "retransmission".

Step 102: The receive end evaluates the channel quality of the first channel of the transmit end.

Specifically, in an embodiment of this application, after receiving the data sent by the transmit end, the receive end evaluates the channel quality.

Optionally, in this application, after receiving the data, the receive end may determine, based on an evaluation condition, whether to start an evaluation procedure. In an embodiment, the evaluation condition may be: If a transmission delay between the transmit end and the receive end is greater than a threshold (for example, 4 ms), the evaluation procedure is started. In another embodiment, the evaluation condition may alternatively be a preset period (which may be set based on an actual requirement, for example, 5 ms). In other words, the receive end evaluates the channel quality of the first channel every 5 ms. In still another embodiment, the evaluation condition may alternatively be a specified time point (which may be set based on an actual requirement. For example, after determining that a channel quality evaluation result of the first channel is good, the receive end may perform channel quality evaluation at an interval of 2T duration. If the channel quality evaluation result is relatively poor, the receive end performs evaluation at an interval of T duration).

Optionally, in this application, before sending a first response message, the receive end may evaluate the channel quality of the first channel for a plurality of times. An evaluation result may be an average value, a minimum value, or a maximum value of the plurality of evaluation results. This is not limited in this application.

In addition, in an embodiment of this application, a manner in which the receive end evaluates the channel quality of the first channel may be: obtaining a channel parameter of the first channel, and obtaining the channel quality evaluation result based on the channel parameter. In this application, the channel parameter includes but is not limited to a parameter that may be used to reflect channel quality, such as a CQI, an MCS, a CQI index, and/or an MCS index.

It should be noted that, in this application, if the receive end is a base station, a method for obtaining the channel parameter by the base station is: The base station receives a channel parameter reported by another terminal that shares the first channel with the terminal, where the channel parameter is used to reflect channel quality of a downlink channel between the base station and the terminal. However, based on reciprocity between an uplink channel and a downlink channel, the base station may estimate the channel quality of the first channel based on the channel parameter that is reported by the other terminal and that reflects the downlink channel. If the receive end is a terminal, the terminal may obtain the channel parameter of the first channel based on information such as a signal-to-noise ratio.

Step 103: The receive end determines the first response message based on the channel quality evaluation result.

Specifically, in an embodiment of this application, the receive end obtains the channel quality evaluation result based on the obtained channel parameter, and determines, based on the evaluation result, whether the first response message carries ACK or NACK.

In a possible implementation, if the channel parameter is greater than or equal to a threshold (which may be set based on an actual requirement, for example, the CQI is greater than or equal to 8), or a difference between the channel parameter and a last obtained channel parameter is greater than or equal to a threshold (which may be set based on an actual requirement, for example, a difference between CQIs is greater than or equal to 2), the receive end may determine that the channel quality evaluation result of the first channel is good. On the contrary, if the channel parameter is less than the threshold, or the difference between the channel parameter and the last obtained channel parameter is less than the threshold, the receive end may determine that the channel quality evaluation result of the first channel is relatively poor.

In this application, if the receive end determines that the evaluation result is good, the receive end determines that the first response message carries the ACK. If the receive end determines that the evaluation result is relatively poor, the receive end determines that the first response message carries the NACK. The ACK may be used to indicate that the transmit end does not need to resend the data, and the NACK may be used to indicate to the transmit end to resend the data.

Step 104: The receive end sends the first response message to the transmit end at a triggering moment of a first preset condition.

Specifically, in an embodiment of this application, the receive end determines whether the first preset condition is triggered, and sends a first response message to the transmit end at each triggering moment of the first preset condition.

Optionally, in this application, the first preset condition may be a rule corresponding to a sending occasion of a first response message. For example, the first preset condition may be a preset period corresponding to sending of a first response message, that is, the receive end sends a first response message to the transmit end at a triggering moment of the preset period. Alternatively, the first preset condition may be a preset time point corresponding to sending of a first response message, that is, the receive end may send a first response message aperiodically. For example, each time after obtaining a channel parameter (occasions for obtaining a channel quality parameter are aperiodic), the receive end may determine a channel quality evaluation result based on the channel parameters, and send a first response message. Alternatively, the receive end may determine, based on buffer usage, an occasion for sending the first response message. For example, if the buffer usage of the receive end meets a preset threshold (which may be set based on an actual requirement), the first response message is sent to the transmit end.

Details are described in the following embodiments.

It should be noted that a quantity of first response messages fed back by the base station to the terminal (that is, steps of dashed lines in the figure) in FIG. 5 is merely an example.

Step 105: The transmit end determines, based on a receiving status of the first response message, whether to retransmit the data.

Specifically, in an embodiment of this application, the receiving status of the first response message includes: The first response message is not received, the first response message that carries the ACK has been received, or the first response message that carries the NACK has been received. The transmit end may determine, based on different receiving statuses, whether to retransmit the data.

Optionally, after receiving the first response message that carries the ACK, the transmit end may determine not to retransmit the data. Correspondingly, after receiving the first response message that carries the NACK, the transmit end may determine to retransmit the data.

Optionally, in this application, the transmit end may further determine, according to a preset rule, whether to retransmit the data. A specific setting of the preset rule is described in detail in the following embodiments.

In addition, in a possible implementation, the transmit end may monitor the first channel in real time. To be specific, whether the first response message exists on a channel on which the transmit end exchanges data with the receive end. In another possible implementation, the transmit end may further detect, at a predetermined time interval, whether the first response message exists on the first channel. The predetermined time interval may be a preset period or a specified time point that is agreed with the receive end. To be specific, the transmit end may periodically or aperiodically detect the first channel, to determine whether the first response message exists. This reduces device pressure of the transmit end. It should be noted that the predetermined time interval is a time interval agreed upon by the receive end and the transmit end, that is, a detection period is the same as a sending period of the transmit end, to avoid the following problem: When the receive end has sent a response message, the transmit end does not receive the response message because the transmit end does not perform detection.

It should be noted that, in FIG. 5, that an occasion on which the terminal receives the first response message (that is, step 105) occurs after a plurality of first response messages are received is merely an example. A specific time relationship is determined based on a transmission delay. To be specific, due to a limitation of the transmission delay, the base station has sent a plurality of response messages before the terminal receives the response message for a first time.

Step 106: If a determining result is to resend the data, the transmit end resends the data to the receive end.

Specifically, in an embodiment of this application, if the transmit end determines that the data needs to be retransmitted, the transmit end resends the data to the receive end. If the transmit end determines that the data does not need to be retransmitted, the transmit end does not perform an operation or end the HARQ process according to the preset rule. It should be noted that, in some embodiments of this application, the HARQ process that is ended refers to an HARQ program corresponding to data that is currently being transmitted or data that is being retransmitted (both the data that is being retransmitted and the data that is being transmitted belong to a same data packet). As described above, a plurality of HARQ processes may be established between the transmit end and the receive end, each HARQ process is used to transmit one piece of data, and an HARQ process corresponding to each piece of data has a unique HARQ process number or identifier of the HARQ process. As shown in FIG. 5, after determining that the data needs to be retransmitted, the transmit end may perform a retransmission operation (FIG. 5 shows only one retransmission process, and a specific quantity of retransmissions is performed based on a determining result of the terminal). It should be noted that, based on different HARQ solutions, resending the data (or retransmitting the data) described herein may have different manners. For example, if an HARQ mechanism is a Chase combining scheme, a coding and modulation scheme for retransmission and a specific bit for retransmission are exactly the same as those for initial transmission. If the HARQ mechanism is an incremental redundancy mechanism, the specific bit and the coding and modulation scheme for retransmission may not be exactly the same as those for initial transmission. To be specific, an initial transmission version and a retransmission version belong to a same data packet, and the receive end may combine the initial transmission version and the retransmission version based on an IR mechanism, to perform an operation such as demodulation and decoding.

In conclusion, this embodiment of this application proposes an HARQ solution that can be applied to a terrestrial communications system and a non-terrestrial communications system. The receive end may estimate a channel quality status in advance, to predetermine a data receiving status, and return response information to the transmit end at each triggering moment of a preset condition, so as to implement an early-feedback mechanism. This effectively weakens impact of a data transmission delay on an HARQ and reduces a requirement on data buffering and processing capabilities of a transmit end device.

Figure 6:
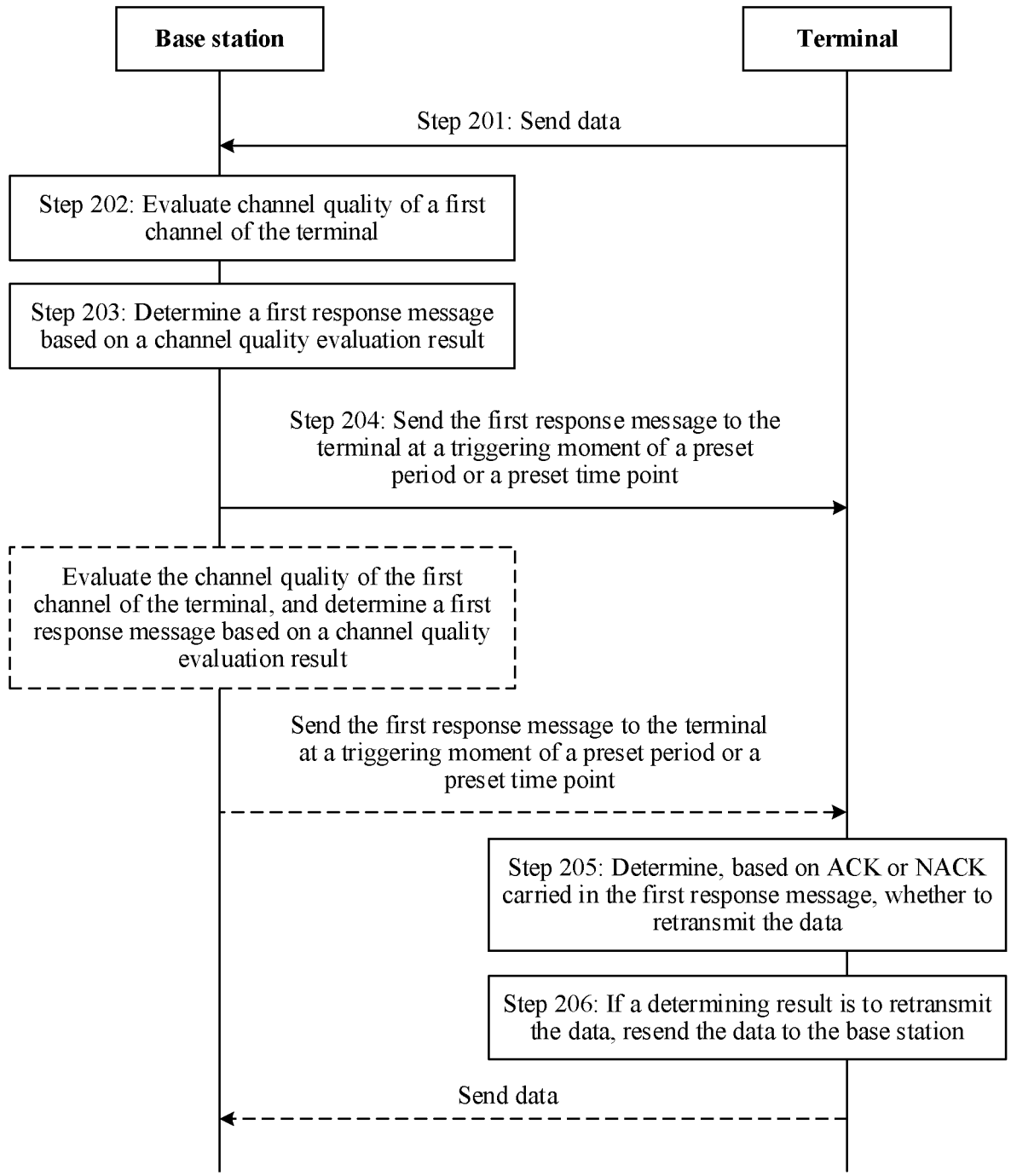
FIG. 6 is a schematic flowchart of a data transmission method according to an embodiment of this application.

Scenario 2:

With reference to FIG. 3, FIG. 6 is a schematic flowchart of a data transmission method according to an embodiment of this application. It should be noted that, in some embodiments of this application, a transmit end may be the terminal/base station in FIG. 3; and correspondingly, a receive end may be the base station/terminal in FIG. 3. In other words, the technical solutions in some embodiments of this application may be applied to a scenario in which the base station communicates with the terminal. Detailed description is provided in an embodiment, the following embodiments, and corresponding accompanying drawings by using an example in which the transmit end is a terminal and the receive end is a base station. A person skilled in the art should know that devices corresponding to the receive end and the transmit end are merely an example in this application. To be specific, a case in which the transmit end is a base station and the receive end is a terminal is also applicable to the technical solutions in some embodiments of this application. Specifically, FIG. 6 includes following steps.

Step 201: The terminal sends data.

For specific details, refer to step 101. Details are not described herein again.

Step 202: The base station evaluates channel quality of a first channel of the terminal.

Specifically, in a possible implementation, the base station may evaluate the channel quality at a triggering moment of an evaluation period. In other words, in this application, there is no correspondence between a sequence of step 202 and step 201. To be specific, each time an evaluation period arrives, the base station starts a channel quality evaluation procedure for the first channel, and obtains an evaluation result. The base station may obtain the data of the terminal before the evaluation period is triggered, or after the evaluation period is triggered, or at a same time point as the evaluation period is triggered. For example, every 5 ms, the base station may evaluate the first channel and obtain an evaluation result. In this case, after a third evaluation period is triggered, the base station receives data sent by the terminal, so that the base station may perform a subsequent operation based on a channel quality evaluation result obtained in the third evaluation period. In addition, in an embodiment, the evaluation period may be a preset period, or the evaluation period may be the same as a period for obtaining a channel parameter by the base station. That is, the base station periodically obtains a channel parameter reported by the terminal, and evaluates the channel quality each time after a channel parameter is obtained. It should be noted that, if the base station aperiodically obtains a channel parameter, the base station may evaluate the channel quality of the first channel each time after a channel parameter is obtained. That is, in some embodiments, the base station may aperiodically evaluate the channel quality.

Optionally, in another possible implementation, the base station may evaluate the channel quality of the first channel before a triggering moment of a first preset condition. For example, as described above, the first preset condition is used to specify a feedback occasion of a first response message, and the base station may evaluate the channel quality before determining that the first response message needs to be fed back. Before evaluating the channel quality, the base station may obtain a plurality of channel parameters reported by the terminal. In this case, the base station may evaluate the channel quality based on the plurality of channel parameters. In an embodiment, if the first preset condition specifies that occasions for feeding back a first response message are periodic, correspondingly, the base station may periodically evaluate the channel quality, where an evaluation period of the channel quality is the same as a period for feeding back a response message. On the other hand, if the first preset condition specifies that the occasions for feeding back a first response message are aperiodic, correspondingly, the base station may aperiodically evaluate the channel quality.

For a specific evaluation manner, refer to step 102. Details are not described herein again.

Step 203: The base station determines the first response message based on a channel quality evaluation result.

Specifically, in some embodiments, if the base station determines that the channel quality evaluation result is good (for an evaluation process, refer to the scenario 1), the base station determines that the first response message carries ACK. On the contrary, if the base station determines that the channel quality evaluation result is relatively poor, the base station determines that the first response message carries NACK.

Step 204: The base station sends the first response message to the terminal at a triggering moment of a preset period or a preset time point.

Specifically, in some embodiments of this application, a feedback occasion on which the base station sends a first response message to the terminal may be a triggering moment of each preset period, or may be a triggering moment of an agreed time point. The preset period may be a specified time interval, for example, 5 ms, that is, the base station feeds back a first response message once every 5 ms. Alternatively, the preset period may be the same as a period for reporting a channel parameter by the terminal. For example, if the period for reporting a channel parameter by the terminal is 3 ms, each time after the base station obtains a channel parameter and evaluates the channel quality, the base station feeds back a first response message to the terminal. Therefore, a feedback period of the first response message is the same as a reporting period of the channel parameter, which is 3 ms. In addition, the base station may further send the first response message at a time point agreed with the terminal, so that the terminal may detect, at the agreed time point, whether the first response message exists on the first channel.

Optionally, in this application, the base station may determine, based on buffer usage, an occasion for sending the first response message. For example, if the buffer usage of the receive end meets a preset threshold (which may be set based on an actual requirement), the first response message is sent to the transmit end.

In addition, optionally, in this application, if the base station detects that each of two first response messages that are fed back consecutively carries ACK, two consecutive channel quality evaluation results are both good. In this case, the base station may proactively stop an evaluation and feedback procedure corresponding to the terminal. Correspondingly, if the terminal does not receive the first response message in two consecutive preset periods or at two consecutive agreed time points, it may decide to end an HARQ process.

Optionally, in this application, if the base station does not receive, within predetermined duration after sending the first response message, the data sent by the transmit end (where a reason may be that the transmit end actively ends the HARQ process based on a determining condition), the base station may determine that the transmit end has ended the HARQ process, and the base station may no longer perform the evaluation and feedback procedure corresponding to the terminal.

Optionally, in this application, if the base station detects that a maximum quantity of retransmissions has been reached, for example, the maximum quantity of retransmissions is 8, and the base station has sent eight first response messages for indicating the transmit end to resend the data, the base station may stop the evaluation and feedback procedure corresponding to the terminal.

Step 205: The terminal determines, based on the ACK or the NACK carried in the first response message, whether to retransmit the data.

Specifically, in some embodiments, the first response message sent by the base station carries the ACK or the NACK; the terminal may determine, based on information carried in the first response message and the determining condition, whether to resend the data.

In a possible implementation, the determining condition is as follows.

(1) If the first response information is not detected in two or more consecutive preset periods (or agreed time points), it is determined to not resend the data.

(2) When a first response message that carries ACK is received for a first time, the terminal does not perform retransmission processing, but the HARQ process is not ended. If a first response message received next time still carries ACK (which means that two consecutive first response messages are received), the HARQ process is ended. When a first response message received next time carries NACK, the data is retransmitted until two or more consecutive first response messages that carry ACK are received or a maximum quantity of retransmissions that is required by a system is reached, and then the HARQ process may be ended. In addition, when a first response message that carries NACK is received for a first time, the terminal retransmits the data until two or more consecutive first response messages that carry ACK are received or the maximum quantity of retransmissions that is required by the system is reached, and then the HARQ process may be ended.

To be specific, in the determining condition, if the terminal receives two or more consecutive first response message that carry ACK, the HARQ process corresponding to the data is ended. In addition, each time the terminal receives a first response message carrying NACK, the data is retransmitted.

(3) When a first response message that carries ACK is received for a first time, retransmission processing is not performed, and the ACK (it should be noted that the ACK is only 1-bit data) is buffered (for a subsequent logical operation). When ACK or NACK is received for a second time, a logical operation AND is used. It is assumed that the ACK is 1 and the NACK is 0. For example, when the ACK is received, a logical operation AND result is 1, data about the previously buffered ACK is discarded, and the terminal does not retransmit the data. When the NACK is received, the logical operation AND result is 0. The terminal retransmits the data and discards the data about the previously buffered ACK. The terminal repeatedly sends the data until the maximum quantity of retransmissions is reached. Alternatively, when a first response message that carries NACK is received for a first time, the terminal retransmits the data and buffers a NACK value. When ACK or NACK is received for a second time, a logical operation OR is used. It is assumed that the ACK is 1 and the NACK is 0. For example, if the ACK is received for the second time, a logical operation OR result is 1. In this case, retransmission processing is not performed, and buffered (NACK, ACK) is discarded. If the NACK is received for the second time, the logical operation OR result is 0. In this case, the terminal retransmits the data, and ends the HARQ process when the buffered (NACK, NACK) continues to be retained until the logical operation OR result is 1 (that is, the ACK is received) or a quantity of data retransmissions reaches a maximum value required by the system.

To be specific, in the determining condition, if the terminal receives the NACK for the first time, in a subsequent process, if ACK is received once or for more times, the HARQ process may be ended; if NACK is received, the data is retransmitted.

(4) When a first response message that carries ACK is received for a first time, retransmission processing is not performed, and the ACK is buffered. When ACK or NACK is received for a second time, a logical operation AND is used. It is assumed that the ACK is 1 and the NACK is 0. For example, when the ACK is received, a first logical operation AND result is 1, and the terminal discards the previously buffered ACK and does not retransmit the data. When the NACK is received, the first logical operation AND result is 0, and the terminal retransmits the data and discards data about the previously buffered ACK. When the terminal receives ACK or NACK subsequently, the terminal processes in a same way as the ACK or the NACK is received for the first time. In addition, when the terminal receives a first response message that carries NACK for a first time, the terminal retransmits the data and buffers a NACK value. When ACK or NACK is received for a second time, a logical operation OR is used. It is assumed that the ACK is 1 and the NACK is 0. For example, if the ACK is received for the second time, a logical operation OR result is 1, and the terminal does not retransmit the data and discards the previously buffered NACK value. If a NACK value is received for a second time, the logical operation OR result is 0. The terminal retransmits the data, discards the NACK value buffered for the first time, and retains only this NACK value. When NACK or ACK is received subsequently, the terminal continues to perform the logical operation OR operation.

To be specific, in the determining condition, after receiving NACK for a first time, the terminal performs the logical operation OR subsequently, to reduce operation complexity of the terminal. In addition, in the determining condition, the terminal does not end a process until the maximum quantity of retransmissions is reached.

(5) When a first response message that carries ACK is received for a first time, the terminal does not perform retransmission processing, and buffers the ACK. When ACK or NACK is received for a second time, a logical operation AND is used. It is assumed that the ACK is 1 and the NACK is 0. For example, when the ACK is received, a first logical operation AND result is 1, and the terminal discards data about the previously buffered ACK and does not retransmit the data. When the NACK is received, the first logical operation AND result is 0, and the terminal retransmits the data and discards the previously buffered ACK. When the terminal receives the ACK or the NACK subsequently, the terminal processes in a same way as the ACK or the NACK is received for the first time. In addition, when a first response message that carries NACK is received for a first time, the terminal retransmits the data and buffers the NACK. When ACK or NACK is received for a second time, a logical operation OR is used. It is assumed that the ACK is 1 and the NACK is 0. For example, if the ACK is received for the second time, a logical operation OR result is 1, and the terminal does not retransmit the data and discards the previously buffered NACK. If the NACK is received for the second time, the logical operation OR result is 0, and the terminal retransmits the data and discards the previously buffered NACK. When a source end receives ACK or NACK subsequently, the source end processes in a same way as the ACK/NACK is received for the first time.

To be specific, in the determining condition, if the terminal receives the ACK, the data is not retransmitted; if the terminal receives the NACK, the data is retransmitted. In addition, in the determining condition, the terminal does not end a process until the maximum quantity of retransmissions is reached.

Optionally, in this application, the terminal may detect, based on a preset period or a preset time point agreed with the base station, whether the first response message exists on the first channel. Alternatively, the terminal may further monitor the first channel in real time, to obtain the first response message.

It should be noted that, in FIG. 6, that an occasion on which the terminal receives the first response message (that is, step 205) occurs after a plurality of first response messages are received is merely an example. A specific time relationship is determined based on a transmission delay. To be specific, due to a limitation of the transmission delay, the base station may have sent a plurality of response messages before the terminal receives the response message for a first time.

Step 206: If a determining result is to resend the data, the terminal resends the data to the base station.

Specifically, in an embodiment of this application, if the transmit end determines that the data needs to be retransmitted, the transmit end resends the data to the receive end. Optionally, in this application, if the transmit end determines that the data does not need to be retransmitted, the transmit end does not perform an operation or end the HARQ process. As shown in FIG. 6, after determining that the data needs to be retransmitted, the transmit end may perform a retransmission operation (FIG. 6 shows only one retransmission process, and a specific quantity of retransmissions is performed based on a determining result of the terminal).

Figure 7:
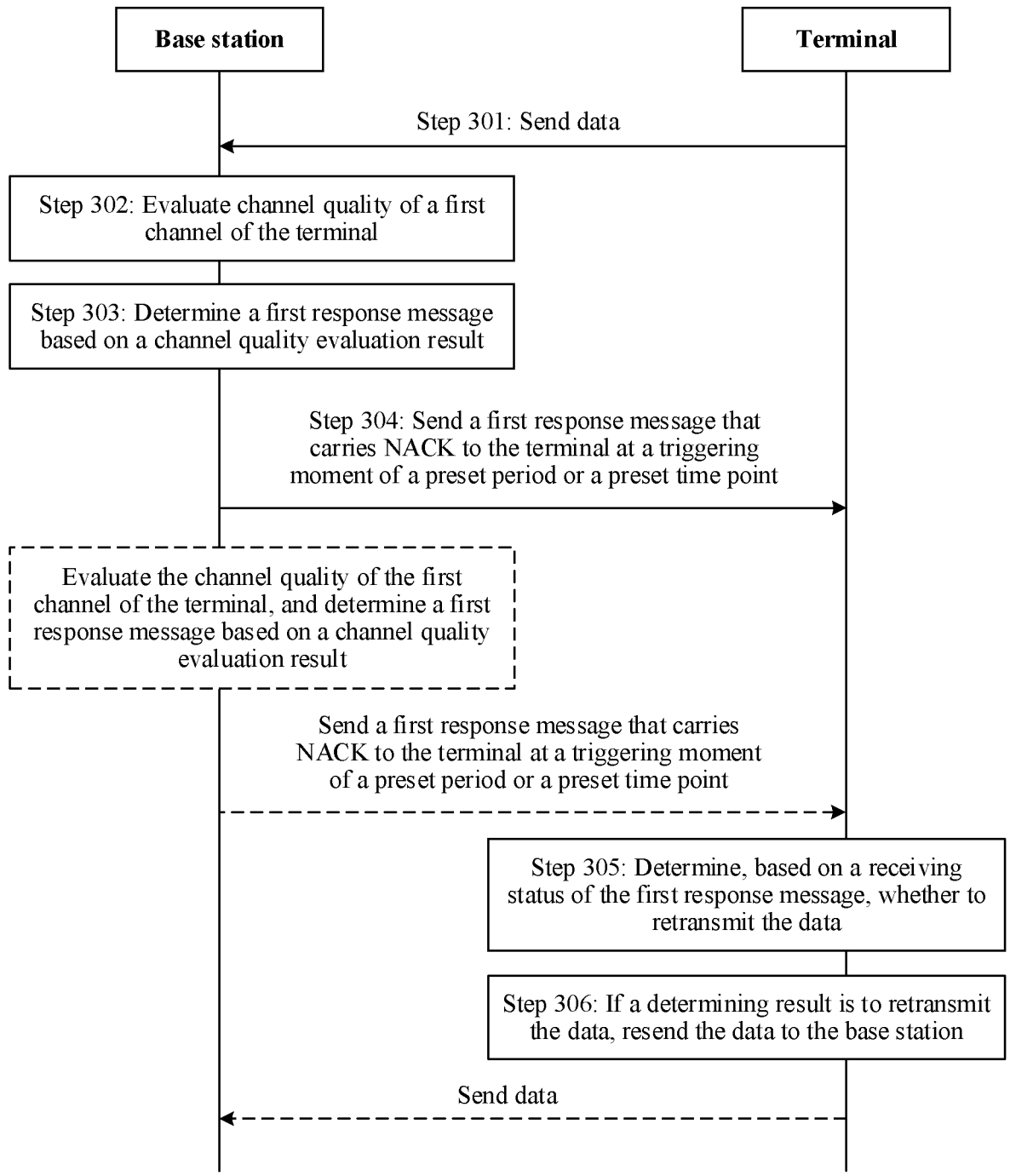
FIG. 7 is a schematic flowchart of a data transmission method according to an embodiment of this application.

Scenario 3:

With reference to FIG. 3, FIG. 7 is a schematic flowchart of a data transmission method according to an embodiment of this application. FIG. 7 includes following steps.

Step 301: A terminal sends data.

For specific details, refer to step 101. Details are not described herein again.

Step 302: A base station evaluates channel quality of a first channel of the terminal.

Specifically, in some embodiments, the base station may evaluate the channel quality of the first channel at a predetermined time interval, where the predetermined time interval may be periodic or aperiodic, that is, the base station may evaluate the channel quality based on a predetermined period, or may evaluate the channel quality at a specified time point. For specific details, refer to step 202. Details are not described herein again.

Step 303: The base station determines a first response message based on a channel quality evaluation result.

Specifically, in some embodiments, if the base station determines that the channel quality evaluation result is good (for an evaluation process, refer to the scenario 1), the base station determines that the first response message carries ACK. On the contrary, if the base station determines that the channel quality evaluation result is relatively poor, the base station determines that the first response message carries NACK.

Optionally, in this application, when determining that the channel quality evaluation result is good, the base station may not send the first response message to the terminal. If the base station determines that the channel quality evaluation result is relatively poor, step 304 is performed.

Step 304: The base station sends the first response message that carries the NACK to the terminal at a triggering moment of a preset period or a preset time point.

A feedback occasion on which the base station sends the first response message to the terminal may be a triggering moment of each preset period, or may be a triggering moment of an agreed time point. The preset period may be a specified time interval, for example, 5 ms, that is, the base station feeds back a first response message once every 5 ms. Alternatively, the preset period may be the same as a period for reporting a channel parameter by the terminal. For example, if the period for reporting a channel parameter by the terminal is 3 ms, each time after the base station obtains a channel parameter and evaluates the channel quality, the base station feeds back a first response message to the terminal. Therefore, a feedback period of the first response message is the same as a reporting period of the channel parameter, which is 3 ms. In addition, the base station may further send the first response message at a time point agreed with the terminal, so that the terminal may detect, at the agreed time point, whether the first response message exists on the first channel.

In addition, optionally, in this application, the base station detects that two consecutive channel quality evaluation results are both good. In this case, the base station may actively stop an evaluation and feedback procedure corresponding to the terminal. Correspondingly, if the terminal does not receive the first response message in two consecutive preset periods or at two consecutive agreed time points, it may be determined to end an HARQ process.

Optionally, in this application, if the base station does not receive, within predetermined duration after sending the first response message, the data sent by a transmit end (where a reason may be that the transmit end actively ends the HARQ process based on a determining condition), the base station may determine that the transmit end has ended the HARQ process, and the base station may no longer perform the evaluation and feedback procedure corresponding to the terminal.

Optionally, in this application, if the base station detects that a maximum quantity of retransmissions has been reached, for example, the maximum quantity of retransmissions is 8, and the base station has sent eight first response messages for indicating the transmit end to resend the data, the base station may stop the evaluation and feedback procedure corresponding to the terminal.

In addition, in some embodiments, as described in step 303, the base station does not send, to the terminal, the first response message that carries the ACK, but only sends, to the terminal, the first response message that carries the NACK, thereby effectively reducing device pressure of the base station and improving resource utilization.

Step 305: The terminal determines, based on a receiving status of the first response message, whether to retransmit the data.

Specifically, in some embodiments, if the terminal does not receive the first response message within duration T, the terminal may consider by default that information fed back by the base station is the ACK.

Optionally, the duration T may be equal to duration of a predetermined period agreed upon by the terminal and the base station, that is, if the terminal does not receive the first response message within the predetermined period, the terminal considers by default that feedback information corresponding to the predetermined period is the ACK.

Optionally, the duration T may alternatively be a time point agreed upon by the terminal and the base station, that is, if the terminal does not receive the first response message at a specified time point, the terminal considers by default that the feedback information is the ACK.

Optionally, the duration T may further include at least two time periods for feedback of ACK receiving (for example, two preset periods or two agreed time points), to avoid the following problem: If a channel quality evaluation result is good, but the terminal does not receive feedback information within duration less than T/2, the terminal considers by default that the base station feeds back the ACK, and a channel quality evaluation result within duration from T/2 to T is relatively poor, the information fed back by the base station is the NACK.

Optionally, if the terminal receives the first response message that carries the NACK, the data is retransmitted.

Optionally, the terminal may further determine, with reference to the determining condition in the scenario 2, whether to retransmit the data based on the receiving status of the first response message.

It should be noted that, in FIG. 7, that an occasion on which the terminal receives the first response message (that is, step 305) occurs after a plurality of first response messages are received is merely an example. A specific time relationship is determined based on a transmission delay. To be specific, due to a limitation of the transmission delay, the base station may have sent a plurality of response messages before the terminal receives the response message for a first time.

Step 306: If a determining result is to resend the data, the terminal resends the data to the base station.

Specifically, in some embodiments of this application, if the transmit end determines that the data needs to be retransmitted, the transmit end resends the data to a receive end. Optionally, in this application, if the transmit end determines that the data does not need to be retransmitted, the transmit end does not perform an operation or end the HARQ process. As shown in FIG. 7, after determining that the data needs to be retransmitted, the transmit end may perform a retransmission operation (FIG. 7 shows only one retransmission process, and a specific quantity of retransmissions is performed based on a determining result of the terminal).

Figure 8:
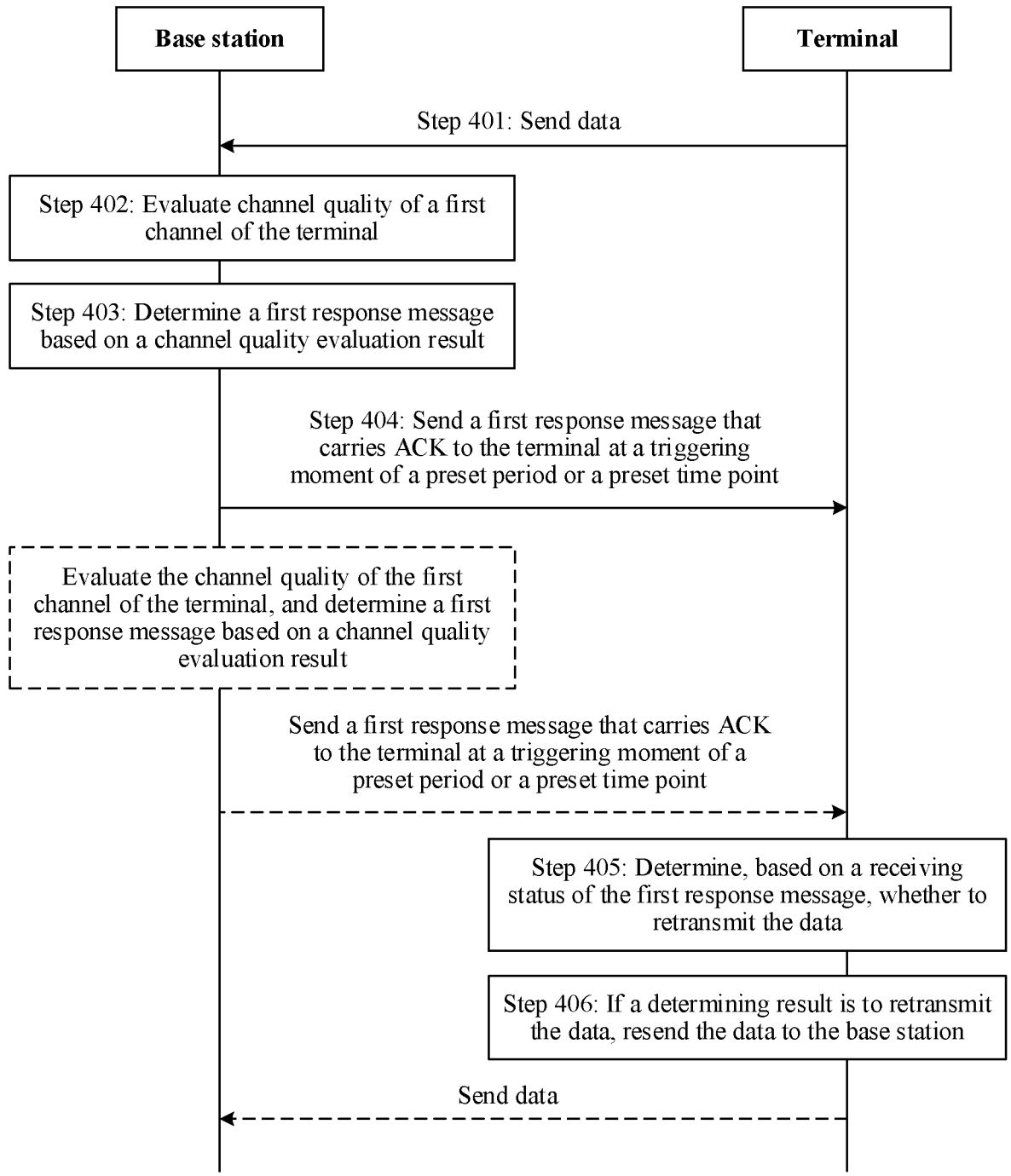
FIG. 8 is a schematic flowchart of a data transmission method according to an embodiment of this application.

Scenario 4:

With reference to FIG. 3, FIG. 8 is a schematic flowchart of a data transmission method according to an embodiment of this application. FIG. 8 includes following steps.

Step 401: A terminal sends data.

For specific details, refer to step 101. Details are not described herein again.

Step 402: A base station evaluates channel quality of a first channel of the terminal.

Specifically, in some embodiments, the base station may evaluate the channel quality of the first channel at a predetermined time interval, where the predetermined time interval may be periodic or aperiodic, that is, the base station may evaluate the channel quality based on a predetermined period, or may evaluate the channel quality at a specified time point. For specific details, refer to step 202. Details are not described herein again.

Step 403: The base station determines a first response message based on a channel quality evaluation result.

Specifically, in some embodiments, if the base station determines that the channel quality evaluation result is good (for an evaluation process, refer to the scenario 1), the base station determines that the first response message carries ACK. On the other hand, if the base station determines that the channel quality evaluation result is relatively poor, the base station determines that the first response message carries NACK.

Optionally, in this application, when determining that the channel quality evaluation result is good, the base station sends the first response message to the terminal. In step 404, if the base station determines that the channel quality evaluation result is relatively poor, the base station does not send the first response message to the terminal.

Step 404: The base station sends the first response message that carries the ACK to the terminal at a triggering moment of a preset period or a preset time point.

A feedback occasion on which the base station sends the first response message to the terminal may be a triggering moment of each preset period, or may be a triggering moment of an agreed time point. The preset period may be a specified time interval, for example, 5 ms, that is, the base station feeds back a first response message once every 5 ms. Alternatively, the preset period may be the same as a period for reporting a channel parameter by the terminal. For example, if the period for reporting a channel parameter by the terminal is 3 ms, each time after the base station obtains a channel parameter and evaluates the channel quality, the base station feeds back the first response message to the terminal. Therefore, a feedback period of the first response message is the same as a reporting period of the channel parameter, which is 3 ms. In addition, the base station may further send the first response message at a time point agreed with the terminal, so that the terminal may detect, at the agreed time point, whether the first response message exists on the first channel.

In addition, optionally, in this application, the base station detects that two consecutive channel quality evaluation results are both good. In this case, the base station may actively stop an evaluation and feedback procedure corresponding to the terminal. Correspondingly, if the terminal does not receive the first response message in two consecutive preset periods or at two consecutive agreed time points, it may be determined to end the HARQ process.

Optionally, in this application, if the base station does not receive, within predetermined duration after sending the first response message, the data sent by a transmit end (where a reason may be that the transmit end actively ends the HARQ process based on a determining condition), the base station may determine that the transmit end has ended the HARQ process, and the base station may no longer perform the evaluation and feedback procedure corresponding to the terminal.

Optionally, in this application, if the base station detects that a maximum quantity of retransmissions has been reached, for example, the maximum quantity of retransmissions is 8, and the base station has sent eight first response messages for indicating the transmit end to resend the data, the base station may stop the evaluation and feedback procedure corresponding to the terminal.

In addition, in some embodiments, as described in step 303, the base station does not send, to the terminal, the first response message that carries the NACK, but only send, to the terminal, the first response message that carries the ACK, thereby effectively reducing device pressure of the base station and improving resource utilization.

Step 405: The terminal determines, based on a receiving status of the first response message, whether to retransmit the data.

Specifically, in some embodiments, if the terminal does not receive the first response message within duration T, the terminal may consider by default that information fed back by the base station is the NACK.

Optionally, the duration T may be equal to duration of a predetermined period agreed upon by the terminal and the base station, that is, if the terminal does not receive the first response message within the predetermined period, the terminal considers by default that feedback information corresponding to the predetermined period is the ACK.

Optionally, the duration T may alternatively be a time point agreed upon by the terminal and the base station, that is, if the terminal does not receive the first response message at a specified time point, the terminal considers by default that the feedback information is the ACK.

Optionally, the duration T may further include at least two time periods for feedback of NACK receiving (for example, two preset periods or two agreed time points), to avoid the following problem: If a channel quality evaluation result is good, but the terminal does not receive feedback information within duration less than T/2, the terminal considers by default that the base station feeds back the NACK, and a channel quality evaluation result within duration from T/2 to T is relatively poor, the information fed back by the base station is the ACK.

Optionally if the terminal considers by default that the first response message that carries the NACK is received, the data is retransmitted.

Optionally, the terminal may further determine, with reference to the determining condition in the scenario 2, whether to retransmit the data based on the receiving status of the first response message.

It should be noted that, in FIG. 8, that an occasion on which the terminal receives the first response message (that is, step 405) occurs after a plurality of first response messages are received is merely an example. A specific time relationship is determined based on a transmission delay. To be specific, due to a limitation of the transmission delay, the base station has sent a plurality of response messages before the terminal receives the response message for a first time.

Step 406: If a determining result is to resend the data, the terminal resends the data to the base station.

Specifically, in an embodiment of this application, if the transmit end determines that the data needs to be retransmitted, the transmit end resends the data to a receive end. Optionally, in this application, if the transmit end determines that the data does not need to be retransmitted, the transmit end does not perform an operation or end the HARQ process. As shown in FIG. 8, after determining that the data needs to be retransmitted, the transmit end may perform a retransmission operation (FIG. 8 shows only one retransmission process, and a specific quantity of retransmissions is performed based on a determining result of the terminal).

Figure 9:
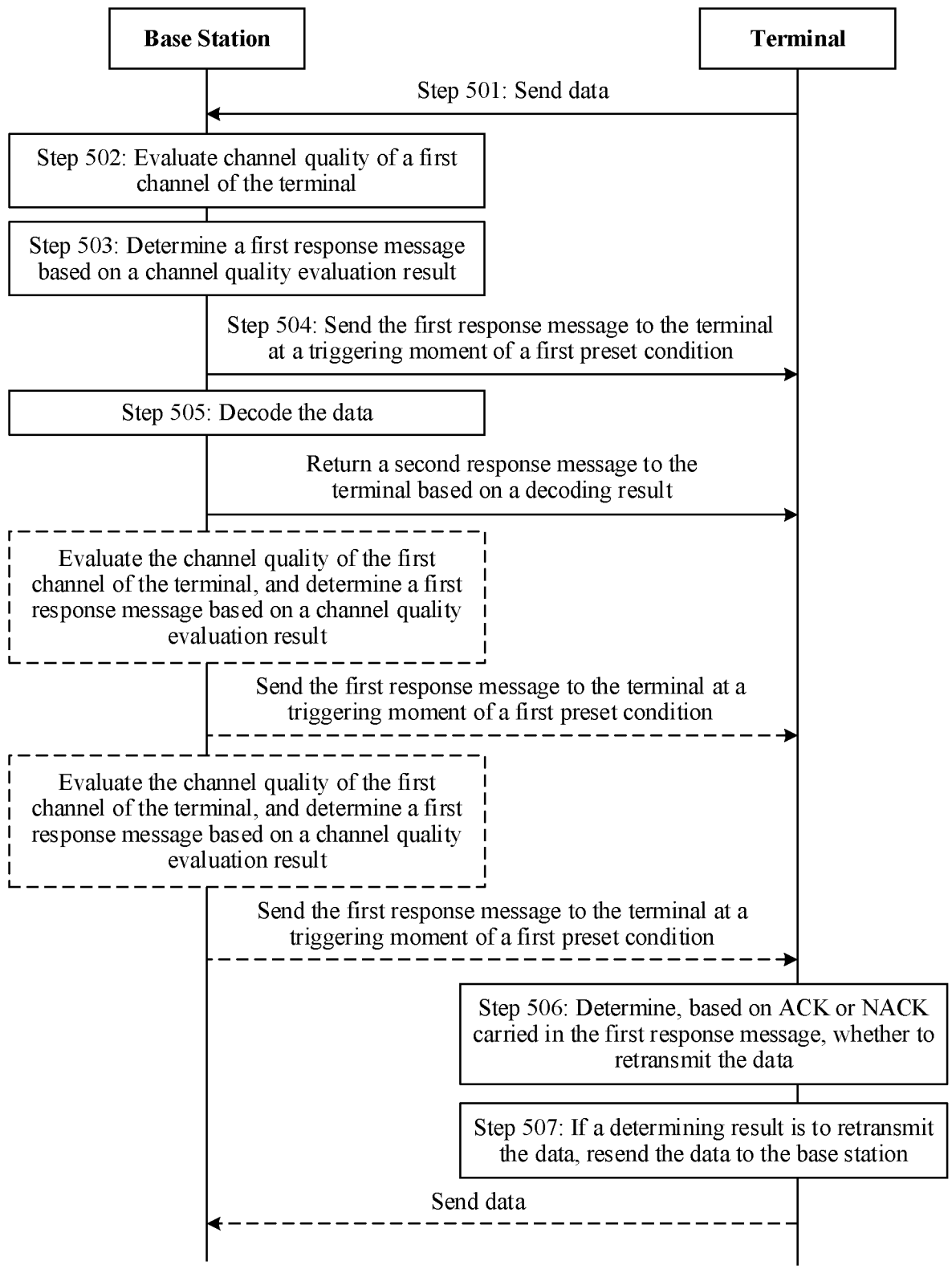
FIG. 9 is a schematic flowchart of a data transmission method according to an embodiment of this application.

Scenario 5:

With reference to FIG. 3, FIG. 9 is a schematic flowchart of a data transmission method according to an embodiment of this application. FIG. 9 includes following steps.

Step 501: A terminal sends data.

For specific details, refer to step 101. Details are not described herein again.

Step 502: A base station evaluates channel quality of a first channel of the terminal.

Specifically, in an embodiment, the base station may evaluate the channel quality of the first channel at a predetermined time interval, where the predetermined time interval may be periodic or aperiodic, that is, the base station may evaluate the channel quality based on a predetermined period, or may evaluate the channel quality at a specified time point. For specific details, refer to step 202. Details are not described herein again.

Step 503: The base station determines a first response message based on a channel quality evaluation result.

Specifically, in an embodiment, if the base station determines that the channel quality evaluation result is good (for an evaluation process, refer to the scenario 1), the base station determines that the first response message carries ACK. On the other hand, if the base station determines that the channel quality evaluation result is relatively poor, the base station determines that the first response message carries NACK.

Step 504: The base station sends the first response message to the terminal at a triggering moment of a first preset condition.

Specifically, in an embodiment of this application, a feedback occasion on which the base station sends a first response message to the terminal may be a triggering moment of each preset period, or may be a triggering moment of an agreed time point. The preset period may be a specified time interval, for example, 5 ms, that is, the base station feeds back a first response message once every 5 ms. Alternatively, the preset period may be the same as a period for reporting a channel parameter by the terminal. For example, if the period for reporting a channel parameter by the terminal is 3 ms, each time after the base station obtains a channel parameter and evaluates the channel quality, the base station feeds back a first response message to the terminal. Therefore, a feedback period of the first response message is the same as a reporting period of the channel parameter, which is 3 ms. In addition, the base station may further send the first response message at a time point agreed with the terminal, so that the terminal may detect, at the agreed time point, whether the first response message exists on the first channel.

Optionally, in this application, the base station may determine, based on buffer usage, an occasion for sending the first response message. For example, if buffer usage of a receive end meets a preset threshold (which may be set based on an actual requirement), the first response message is sent to the terminal.

In addition, optionally, in this application, if the base station detects that each of two first response messages that are fed back consecutively carries ACK, two consecutive channel quality evaluation results are both good. In this case, the base station may actively stop an evaluation and feedback procedure corresponding to the terminal. Correspondingly, if the terminal does not receive the first response message in two consecutive preset periods or at two consecutive agreed time points, it may be determined to end the HARQ process.

Optionally, in this application, if the base station does not receive, within predetermined duration after sending the first response message, the data sent by the transmit end (where a reason may be that the transmit end actively ends the HARQ process based on a determining condition), the base station may determine that the transmit end has ended the HARQ process, and the base station may no longer perform the evaluation and feedback procedure corresponding to the terminal.

Optionally, in this application, if the base station detects that a maximum quantity of retransmissions has been reached, for example, the maximum quantity of retransmissions is 8, and the base station has sent eight first response messages for indicating the transmit end to resend the data, the base station may stop the evaluation and feedback procedure corresponding to the terminal.

Optionally, a feedback mechanism of the base station may also be combined with the scenario 3 and the scenario 4, that is, a scenario in which only ACK or NACK is fed back. Correspondingly, a procedure of the terminal may also be combined with the embodiments in the scenario 3 and the scenario 4.

Step 505: The base station decodes the data, and returns a second response message to the terminal based on a decoding result.

Specifically, in an embodiment of this application, the base station decodes the data. For a specific decoding process, refer to an existing embodiment. Details are not described again in this application.

Optionally, in this application, if the base station succeeds to decode the data, the base station feeds back, to the terminal, a second response message that carries ACK. If the base station fails to decode the data, the base station feeds back, to the terminal, a second response message that carries NACK.

Figure 10:
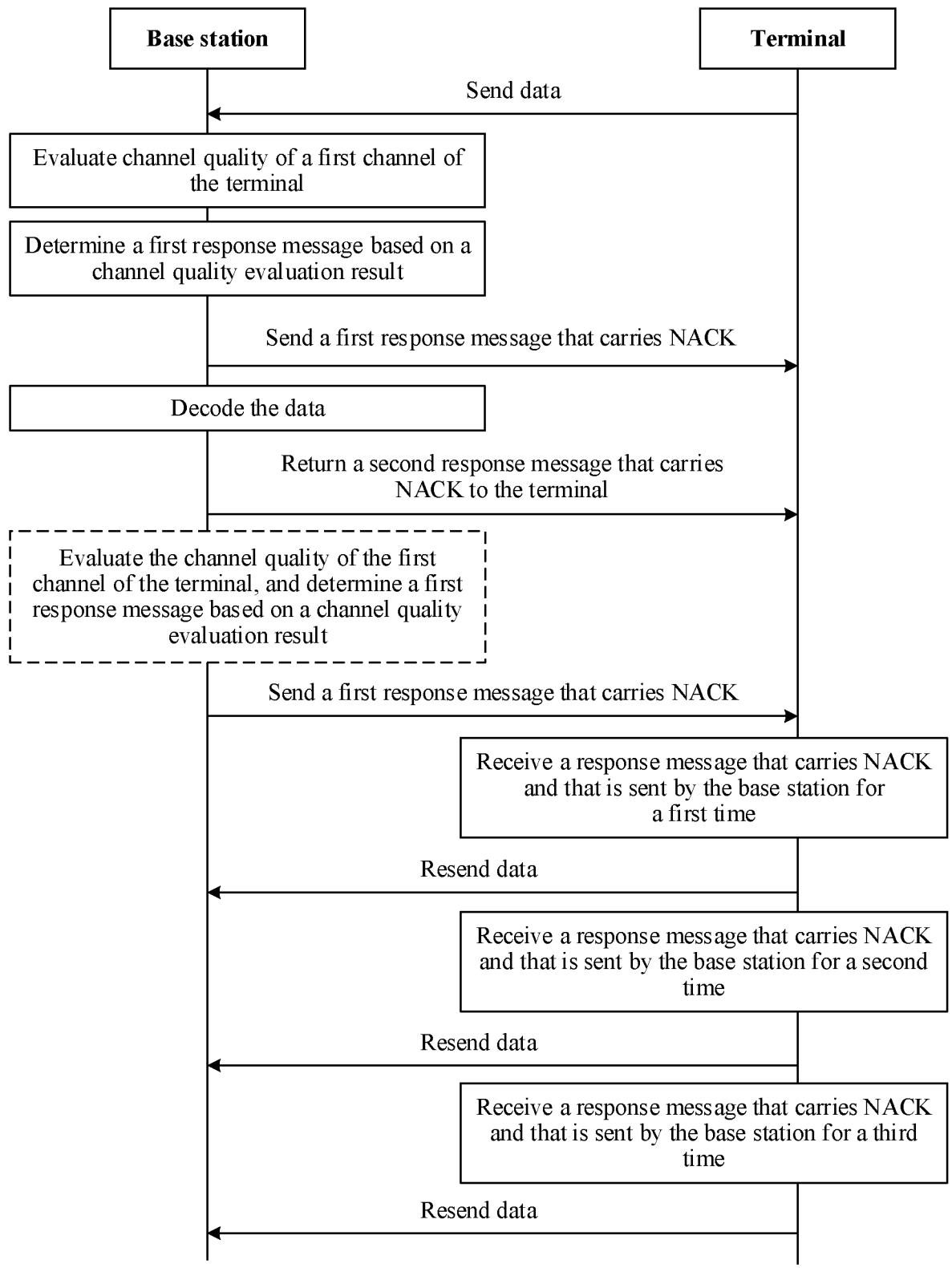
FIG. 10 is a schematic flowchart of a data transmission method according to an embodiment of this application.

It should be noted that, in some embodiments of this application, after returning the second response message, the base station still performs the evaluation and feedback procedure. As shown in FIG. 9, the base station decodes the data after returning the first response message to the terminal, and returns the second response message. Then, the base station continues to return the first response message to the terminal at the triggering moment of the first preset condition, that is, in an embodiment of this application, the base station simultaneously performs an evaluation and feedback procedure on the first channel and a decoding and feedback procedure on the data. It should be noted that feedback occasions of the first response message and the second response message shown in FIG. 9 are merely an example, and a specific time relationship is associated with a feedback mechanism (that is, a triggering moment for sending the first response message and the second response message) set on a base station side. For example, as shown in FIG. 10, after receiving the data sent by the terminal, if the base station determines that a transmission delay between the base station and the terminal is greater than a threshold, the base station evaluates the channel quality of the first channel, and feeds back, to the terminal based on an evaluation result, the first response message that carries the NACK. Subsequently, the base station performs evaluation once every 3 ms, and feeds back a first response message (it is assumed that the base station feeds back NACK each time). At the fourth ms, the base station fails in decoding, and feeds back a second response message that carries NACK to the terminal. It is assumed that the transmission delay between the terminal and the base station is 200 ms. In this case, the terminal receives, 400 ms (ignoring duration occupied by evaluation) after transmitting data, a first response message that is fed back by the base station and that carries NACK, and resends the data. After 3 ms elapses, the terminal receives a response message sent for a second time and resends the data. In addition, 1 ms after the response message sent for the second time, a response message sent for a third time (namely, the second response message that is fed back by the base station when decoding fails, where a terminal side does not distinguish between the first response message and the second response message) is received, and the data is resent.

Optionally, in this application, after successfully decoding the data, the base station may stop a channel quality evaluation and feedback procedure on the first channel.

Step 506: The terminal determines, based on ACK or NACK carried in a response message, whether to retransmit the data.

Specifically, in an embodiment, the first response message sent by the base station carries the ACK or the NACK; the terminal may determine, based on information carried in the first response message and the determining condition, whether to resend the data.

In an embodiment, for the determining condition, refer to any rule in the determining condition (1) to the determining condition (5) in the scenario 2.

Step 507: If a determining result is to resend the data, the terminal resends the data to the base station.

Specifically, in an embodiment of this application, if the transmit end determines that the data needs to be retransmitted, the transmit end resends the data to the receive end. Optionally, in this application, if the transmit end determines that the data does not need to be retransmitted, the transmit end does not perform an operation or end the HARQ process. As shown in FIG. 9, after determining that the data needs to be retransmitted, the transmit end may perform a retransmission operation (FIG. 9 shows only one retransmission process, and a specific quantity of retransmissions is performed based on a determining result of the terminal).

Figure 11:
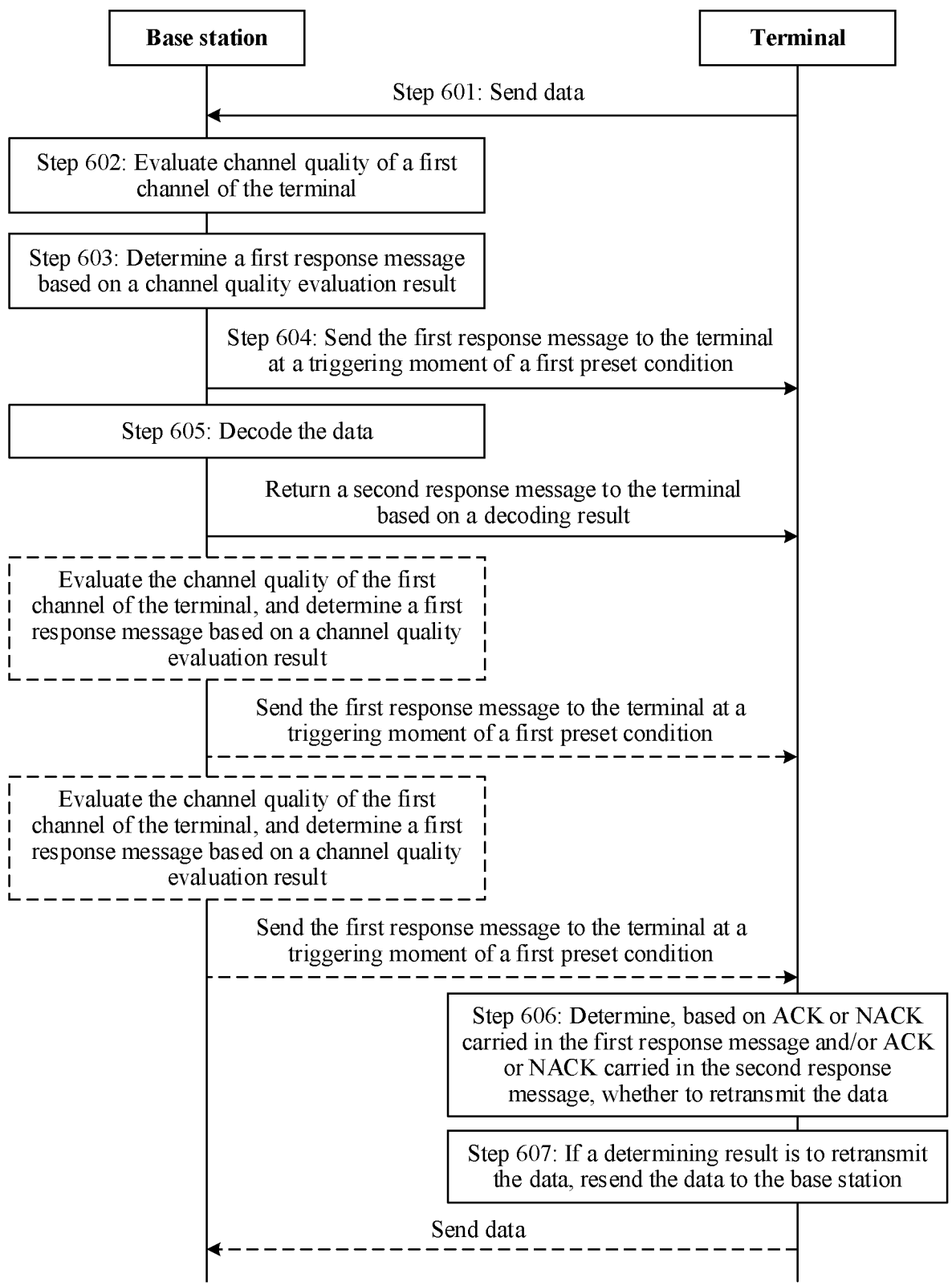
FIG. 11 is a schematic flowchart of a data transmission method according to an embodiment of this application.

Scenario 6:

With reference to FIG. 3, FIG. 11 is a schematic flowchart of a data transmission method according to an embodiment of this application. FIG. 11 includes following steps.

Step 601: A terminal sends data.

For specific details, refer to step 101. Details are not described herein again.

Step 602: A base station evaluates channel quality of a first channel of the terminal.

Specifically, in an embodiment, the base station may evaluate the channel quality of the first channel at a predetermined time interval, where the predetermined time interval may be periodic or aperiodic, that is, the base station may evaluate the channel quality based on a predetermined period, or may evaluate the channel quality at a specified time point. For specific details, refer to step 202. Details are not described herein again.

Step 603: The base station determines a first response message based on a channel quality evaluation result.

Specifically, in an embodiment, if the base station determines that the channel quality evaluation result is good (for an evaluation process, refer to the scenario 1), the base station determines that the first response message carries ACK. On the other hand, if the base station determines that the channel quality evaluation result is relatively poor, the base station determines that the first response message carries NACK.

Step 604: The base station sends the first response message to the terminal at a triggering moment of a first preset condition.

Specifically, in an embodiment of this application, a feedback occasion on which the base station sends the first response message to the terminal may be a triggering moment of each preset period, or may be a triggering moment of an agreed time point. The preset period may be a specified time interval, for example, 5 ms, that is, the base station feeds back a first response message once every 5 ms. Alternatively, the preset period may be the same as a period for reporting a channel parameter by the terminal. For example, if the period for reporting a channel parameter by the terminal is 3 ms, each time after the base station obtains a channel parameter and evaluates the channel quality, the base station feeds back the first response message to the terminal. Therefore, a feedback period of the first response message is the same as a reporting period of the channel parameter, which is 3 ms. In addition, the base station may further send the first response message at a time point agreed with the terminal, so that the terminal may detect, at the agreed time point, whether the first response message exists on the first channel.

Optionally, in this application, the base station may determine, based on buffer usage, an occasion for sending the first response message. For example, if the buffer usage of a receive end meets a preset threshold (which may be set based on an actual requirement), the first response message is sent to the terminal.

In addition, optionally, in this application, if the base station detects that each of two first response messages that are fed back consecutively carries ACK, two consecutive channel quality evaluation results are both good. In this case, the base station may actively stop an evaluation and feedback procedure corresponding to the terminal. Correspondingly, if the terminal does not receive the first response message in two consecutive preset periods or at two consecutive agreed time points, it may be determined to end the HARQ process.

Optionally, in this application, if the base station does not receive, within predetermined duration after sending the first response message, the data sent by the transmit end (where a reason may be that the transmit end actively ends the HARQ process based on a determining condition), the base station may determine that the transmit end has ended the HARQ process, and the base station may no longer perform the evaluation and feedback procedure corresponding to the terminal.

Optionally, in this application, if the base station detects that a maximum quantity of retransmissions has been reached, for example, the maximum quantity of retransmissions is 8, and the base station has sent eight first response messages for indicating the transmit end to resend the data, the base station may stop the evaluation and feedback procedure corresponding to the terminal.

Optionally, a feedback mechanism of the base station may also be combined with the scenario 3 and the scenario 4, that is, a scenario in which only ACK or NACK is fed back. Correspondingly, a procedure of the terminal may also be combined with the embodiments in the scenario 3 and the scenario 4.

Step 605: The base station decodes the data, and returns a second response message to the terminal based on a decoding result.

Specifically, in an embodiment of this application, the base station decodes the data. For a specific decoding process, refer to an existing embodiment. Details are not described again in this application.

Optionally, in this application, if the base station succeeds to decode the data, the base station feeds back, to the terminal, a second response message that carries ACK. If the base station fails to decode the data, the base station feeds back, to the terminal, a second response message that carries NACK. In other words, a special identifier is carried to distinguish between the first response message and the second response message.

It should be noted that, in some embodiments of this application, after returning the second response message, the base station still performs the evaluation and feedback procedure. As shown in FIG. 11, the base station decodes the data after returning the first response message to the terminal, and returns the second response message. Then, the base station continues to return the first response message to the terminal at the triggering moment of the first preset condition, that is, in an embodiment of this application, the base station simultaneously performs an evaluation and feedback procedure on the first channel and a decoding and feedback procedure on the data. It should be noted that feedback occasions of the first response message and the second response message shown in FIG. 11 are merely an example, and a specific time relationship is associated with a feedback mechanism (that is, a triggering moment for sending the first response message and the second response message) set on a base station side.

Optionally, in this application, after successfully decoding the data, the base station may stop the channel quality evaluation and feedback procedure on the first channel.

Step 606: The terminal determines, based on the ACK or the NACK carried in the first response message and/or the ACK or the NACK carried in the second response message, whether to retransmit the data.

Optionally, before receiving the second response message, the terminal may determine whether to perform retransmission based on the received first response message with reference to any rule in the determining conditions (1), (4), and (5), and perform processing.

Optionally, if the terminal receives the second response message that carries the ACK, the terminal ends the HARQ process.

Step 607: If a determining result is to resend the data, the terminal resends the data to the base station.

Specifically, in an embodiment of this application, if the transmit end determines that the data needs to be retransmitted, the transmit end resends the data to the receive end. Optionally, in this application, if the transmit end determines that the data does not need to be retransmitted, the transmit end does not perform an operation or end the HARQ process. As shown in FIG. 11, after determining that the data needs to be retransmitted, the transmit end may perform a retransmission operation (FIG. 11 shows only one retransmission process, and a specific quantity of retransmissions is performed based on a determining result of the terminal).

The foregoing describes the embodiments of this application from a perspective of interaction between network elements. It may be understood that, to implement the foregoing functions, the transmit end or the receive end include corresponding hardware structures and/or software modules for performing the functions. A person of ordinary skill in the art would easily understand that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, such implementation also falls within the scope of this application.

In the embodiments of this application, division into the functional modules may be performed on the transmit end or the receive end based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in some embodiments of this application, division into the modules is an example, and is merely a logical function division. In actual implementation, another division manner may be used.

Figure 12:
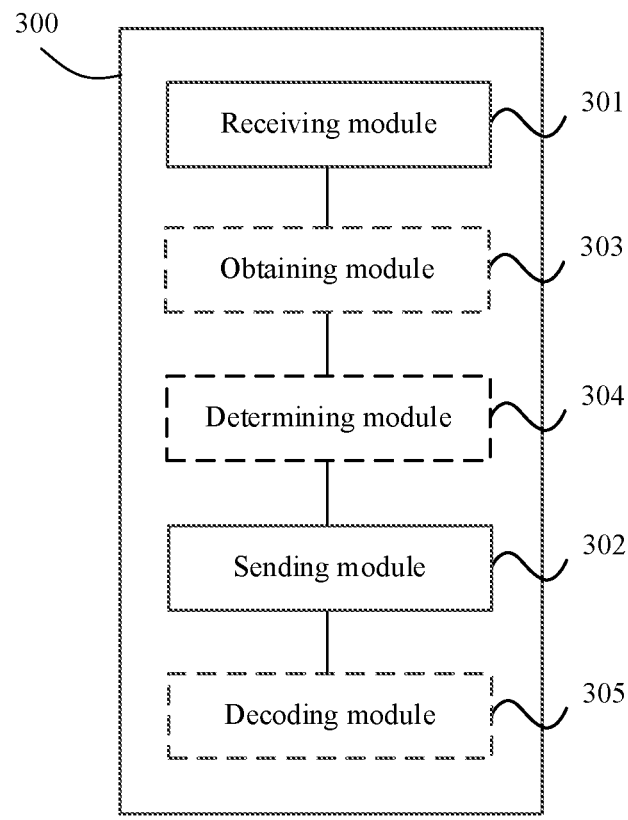
FIG. 12 is a schematic structural diagram of a receive end according to an embodiment of this application.

When each functional module is obtained through division based on a corresponding function, FIG. 12 is a possible schematic structural diagram of a receive end 300 in the foregoing embodiments. As shown in FIG. 12, the receive end 300 may include a receiving module 301 and a sending module 302. The receiving module 301 may be configured to receive data from a transmit end". For example, the module may be configured to support the receive end in performing related steps in step 102, step 202, step 302, step 402, step 502, and step 602 in the foregoing method embodiments. The sending module 302 may be configured to send a first response message to the transmit end at a triggering moment of a first preset condition. For example, the module may be configured to support the receive end in performing related steps in step 104, step 204, step 304, step 404, step 504, and step 604 in the foregoing method embodiments.

Optionally, the receive end 300 may further include an obtaining module 303 and a determining module 304. The obtaining module 303 may be configured to obtain a channel parameter of a first channel. For example, the module may be configured to support the receive end in performing related steps in step 102, step 202, step 302, step 402, step 502, and step 602 in the foregoing method embodiments. The determining module 304 may be configured to determine, based on the channel parameter, that the first response message carries first acknowledgment information or first negative acknowledgment information. For example, the module may be configured to support the receive end in performing related steps in step 103, step 203, step 303, step 403, step 503, and step 603 in the foregoing method embodiments.

In addition, optionally, the receive end 300 may further include a decoding module 305, configured to decode data. For example, the module may be configured to support the receive end in performing related steps in step 505 and step 605 in the foregoing method embodiments. Correspondingly, the sending module is further configured to return second response information to the transmit end based on a decoding result.

Figure 13:
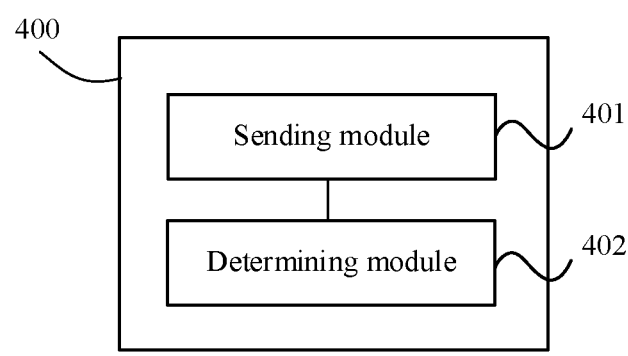
FIG. 13 is a schematic structural diagram of a transmit end according to an embodiment of this application.

FIG. 13 is a possible schematic structural diagram of a transmit end 400 in the foregoing embodiments. As shown in FIG. 13, the transmit end may include a sending module 401 and a determining module 402. The sending module 401 may be configured to send data to a receive end. For example, the module may be configured to support the receive end in performing related steps in step 101, step 201, step 301, step 401, step 501, and step 601 in the foregoing method embodiments. The determining module 402 may be configured to determine, based on a receiving status of a first response message, whether to resend the data. For example, the module may be configured to support the receive end in performing related steps in step 105, step 205, step 305, step 405, step 506, and step 606 in the foregoing method embodiments. The sending module 401 may be further configured to sending the data to the receive end if a determining result is to resend the data. For example, the module may be configured to support the receive end in performing related steps in step 106, step 206, step 306, step 406, step 507, and step 508 in the foregoing method embodiments.

Figure 14:
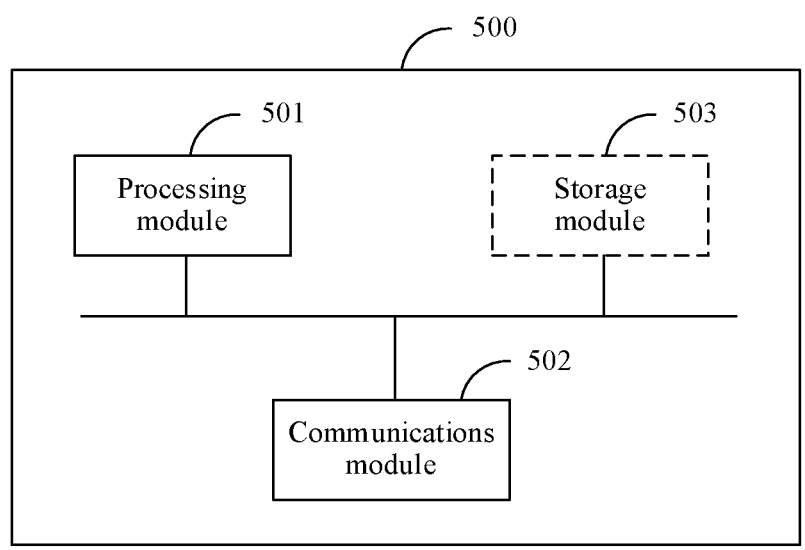
FIG. 14 is a schematic structural diagram of an apparatus according to an embodiment of this application.

The following describes an apparatus provided in an embodiment of this application. As shown in FIG. 14, the apparatus includes a processing module 501 and a communications module 502. Optionally, the apparatus further includes a storage module 503. The processing module 501, the communications module 502, and the storage module 503 are connected by using a communications bus.

The communications module 502 may be an apparatus that has receiving and sending functions, and is configured to communicate with another network device or a communications network.

The storage module 503 may include one or more memories. The memory may be a component configured to store a program or data in one or more devices or circuits.

The storage module 503 may exist independently, and is connected to the processing module 501 by using the communications bus. Alternatively, the storage module and the processing module 501 may be integrated together.

The apparatus 500 may be used in a network device, a circuit, a hardware component, or a chip.

The apparatus 500 may be a transmit end in the embodiments of this application, for example, a terminal 200 or a base station 100. When the apparatus 500 is the terminal 200 in the embodiments of this application, the terminal may be shown in FIG. 4*b*. Optionally, the communications module 502 of the apparatus 500 may include an antenna and a transceiver of the terminal, for example, the antenna 206 and the transceiver 202 in FIG. 4*b*.

The apparatus 500 may be a chip in the terminal in the embodiments of this application. The communications module 502 may be an input/output interface, a pin, a processing circuit, or the like. Optionally, the storage module may store computer-executable instructions of a method on a terminal side, to enable the processing module 501 to perform the method on the terminal side in the foregoing embodiments. The storage module 503 may be a register, a buffer, a RAM, or the like, and the storage module 503 and the processing module 501 may be integrated together. The storage module 503 may be a ROM or another type of static storage device capable of storing static information and instructions, and the storage module 503 may be independent of the processing module 501. Optionally, with development of wireless communications technologies, the transceiver may be integrated into the apparatus 500. For example, the transceiver 202 is integrated into the communications module 502.

When the apparatus 500 is the terminal or the chip in the terminal in the embodiments of this application, the apparatus 500 may implement the method performed by the terminal in the foregoing embodiments.

The apparatus 500 may be the receive end in the embodiments of this application, for example, the base station 100 or the terminal 200. When the apparatus 500 is the base station 100 in the embodiments of this application, the terminal may be shown in FIG. 4*a*. Optionally, the communications module 502 of the apparatus 500 may include an antenna and a transceiver of the terminal, for example, the antenna 105 and the transceiver 103 in FIG. 4*a*. The communications module 502 may further include a network interface of the base station, for example, the network interface 104 in FIG. 4*a*.

The apparatus 500 may be a chip in the base station in the embodiments of this application. The communications module 502 may be an input/output interface, a pin, a processing circuit, or the like. Optionally, the storage module may store computer-executable instructions of a method on a base station side, to enable the processing module 501 to perform the method on the base station side in the foregoing embodiments. The storage module 503 may be a register, a buffer, a RAM, or the like, and the storage module 503 and the processing module 501 may be integrated together. The storage module 503 may be a ROM or another type of static storage device configured to store static information and instructions, and the storage module 503 may be independent of the processing module 501. Optionally, with development of the wireless communications technologies, the transceiver may be integrated into the apparatus 500. For example, the transceiver 103 and the network interface 104 are integrated into the communications module 502.

When the apparatus 500 is the base station in the embodiments of this application or the chip in the base station, the apparatus 500 may implement the method performed by the base station in the foregoing embodiments. An embodiment of this application further provides a computer-readable storage medium. All or some of the methods described in the foregoing embodiments may be implemented by using software, hardware, firmware, or any combination thereof. If the methods are implemented in the software, functions used as one or more instructions or code may be stored in the computer-readable medium or transmitted on the computer-readable medium. The computer-readable medium may include a computer storage medium and a communications medium, and may further include any medium that can transfer a computer program from one place to another. The storage medium may be any available medium accessible to a computer.

In an optional design, the computer-readable medium may include a RAM, a ROM, an EEPROM, a CD-ROM or another optical disc storage, a magnetic disk storage or another magnetic storage device, or any other medium that can be configured to carry or store required program code in a form of instructions or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. All or some of the methods described in the foregoing embodiments may be implemented by using software, hardware, firmware, or any combination thereof. When the methods are implemented in software, all or some of the methods may be implemented in a form of the computer program product. The computer program product includes one or more computer instructions. When the computer program instructions are loaded and executed on a computer, all or some of the procedures or functions described in the foregoing method embodiments are generated. The computer may be a general-purpose computer, a dedicated computer, a computer network, a network device, a user device, or another programmable apparatus.

The foregoing describes the embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A data transmission method, implemented on a receive end, wherein the method comprises:
    evaluating a channel quality of a first channel between the receive end and a transmit end a plurality of times to obtain a plurality of evaluation results and obtaining a channel quality evaluation result, wherein the channel quality evaluation result is an average value, a minimum value, or a maximum value of the plurality of evaluation results;
    determining first acknowledgement information or first negative acknowledgement information based on the channel quality evaluation result; and
    sending a first response message to the transmit end at a triggering moment of a first preset condition, wherein the first response message comprises the first acknowledgement information or the first negative acknowledgement information, and wherein
    when the receive end determines that the channel quality evaluation result is greater than or equal to a threshold, the receive end determines that the first response message carries the first acknowledgement information,
    the first response message is used by the transmit end to determine whether to resend data previously transmitted, wherein receipt of the first response message at a first time directs the transmit end to wait for a next first response message, and receipt of two consecutive first response messages comprising the first acknowledgment information directs the transmit end to end a hybrid automatic repeat request (HARQ) process corresponding to the data.

2. The method according to claim 1, wherein the method further comprises:
    when the receive end determines that the channel quality evaluation result is less than the threshold, the receive end determines that the first response message carries the negative acknowledgement information.

3. The method according to claim 2, wherein the channel quality of the first channel is evaluated based on:
    a channel quality indicator (CQI), a modulation and coding scheme (MCS), a CQI index, or an MCS index.

4. The method according to claim 2, wherein sending a first response message to the transmit end at the triggering moment of the first preset condition comprises:
    if a channel parameter meets a second preset condition, the first response message is not sent; and
    if a channel parameter does not meet a second preset condition, the first response message that carries the first negative acknowledgment information is sent.

5. The method according to claim 2, wherein sending a first response message to the transmit end at the triggering moment of the first preset condition comprises:
    if a channel parameter meets a second preset condition, the first response message that carries the first acknowledgment information is sent; or
    if a channel parameter does not meet a second preset condition, the first response message is not sent.

6. The method according to claim 1, wherein
    the first preset condition is a preset period or a preset time point agreed upon by the receive end and the transmit end.

7. The method according to claim 1, wherein the first preset condition is that buffer usage of the receive end meets a preset threshold.

8. The method according to claim 1, wherein
    the first negative acknowledgment information is used to indicate to the transmit end to resend the data.

9. A receiving device, comprising: at least one processor and at least one memory, wherein
    the at least one memory is configured to store instructions; and wherein when executed, the instructions cause the at least one processor to:
    evaluate a channel quality of a first channel a plurality of times to obtain a plurality of evaluation results and obtaining a channel quality evaluation result, wherein the channel quality evaluation result is an average value, a minimum value, or a maximum value of the plurality of evaluation results;
    determine first acknowledgement information or first negative acknowledgement information based on the channel quality evaluation result; and send a first response message to a transmit end at a triggering moment of a first preset condition, wherein the first response message comprises the first acknowledgment information or the first negative acknowledgement information, and wherein when the receive end determines that the channel quality evaluation result is greater than or equal to a threshold, the receive end determines that the first response message carries the first acknowledgement information, and the first response message is used by the transmit end to determine whether to resend data previously transmitted, wherein receipt of the first response message at a first time directs the transmit end to wait for a next first response message, and receipt of two consecutive first response messages comprising the first acknowledgment information directs the transmit end to end a hybrid automatic repeat request (HARQ) process corresponding to the data.

10. The receiving device according to claim 9, wherein when the receive end determines that the channel quality evaluation result is less than the threshold, the receive end determines that the first response message carries the negative acknowledgement information.

\* \* \* \* \*